(12) United States Patent
Dort

(10) Patent No.: US 7,289,105 B2
(45) Date of Patent: Oct. 30, 2007

(54) REAL MOTION DETECTION SAMPLING AND RECORDING FOR TRACKING AND WRITING INSTRUMENTS USING ELECTRICALLY-ACTIVE VISCOUS MATERIAL AND THIN FILMS

(75) Inventor: David Bogart Dort, Washington, DC (US)

(73) Assignee: VRBIA, Inc., Arlington, VA (US)

( * ) Notice: Subject to any disclaimer, the term of this patent is extended or adjusted under 35 U.S.C. 154(b) by 724 days.

(21) Appl. No.: 10/833,973

(22) Filed: Apr. 27, 2004

(65) Prior Publication Data

US 2006/0181505 A1    Aug. 17, 2006

Related U.S. Application Data

(63) Continuation-in-part of application No. 10/816,531, filed on Apr. 1, 2004.

(60) Provisional application No. 60/475,756, filed on Jun. 4, 2003.

(51) Int. Cl.
*G09G 5/08* (2006.01)

(52) U.S. Cl. ............... 345/158; 345/156; 345/179; 340/686; 340/689

(58) Field of Classification Search ............ 345/156, 345/158, 161, 179, 184; 340/686, 689
See application file for complete search history.

(56) References Cited

U.S. PATENT DOCUMENTS

| 5,338,427 | A  | * | 8/1994 | Shartle et al. ............ 204/604 |
| 5,384,688 | A  | * | 1/1995 | Rockwell .................. 361/736 |
| 6,697,049 | B2 | * | 2/2004 | Lu .............................. 345/161 |
| 2007/0004238 | A1 | * | 1/2007 | Breinlinger et al. .......... 439/63 |

OTHER PUBLICATIONS

PCT Search Report, PCT Application No. PCT/US04/17753, Mailed Sep. 29, 2004.

\* cited by examiner

*Primary Examiner*—Bipin Shalwala
*Assistant Examiner*—Vincent E. Kovalick
(74) *Attorney, Agent, or Firm*—VRBIA, Inc.; Dave Dort

(57) ABSTRACT

The present invention details a system for tracking writing motions internally to the pen (or other instrument) and communicating such motions to a general or specific purposes computer systems. In a preferred embodiment the present invention uses multiple tubes with electrically active material with viscosity surfaces in order to generate the necessary signals to determine the motion of the device in a targeted number of degrees. The data on movement is either supplemented with or oriented with magnetically-active thin film material which generates signals when the device is rotated. The data is then filtered and optionally processed and stored. The data then can be downloaded to a computer or other processing device to determine the motion of the pen or other tracking device.

2 Claims, 27 Drawing Sheets

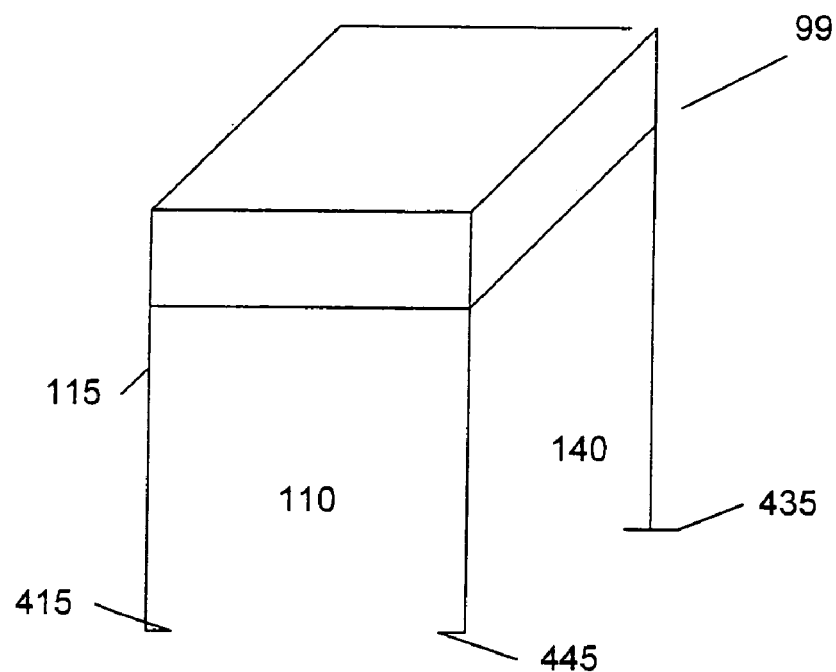
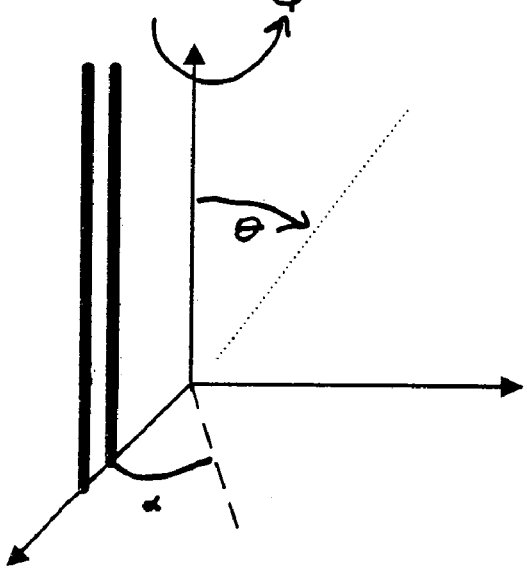
$\theta$ = conical angle
$\alpha$ = tilt
$\phi$ = rotation
FIG. 7

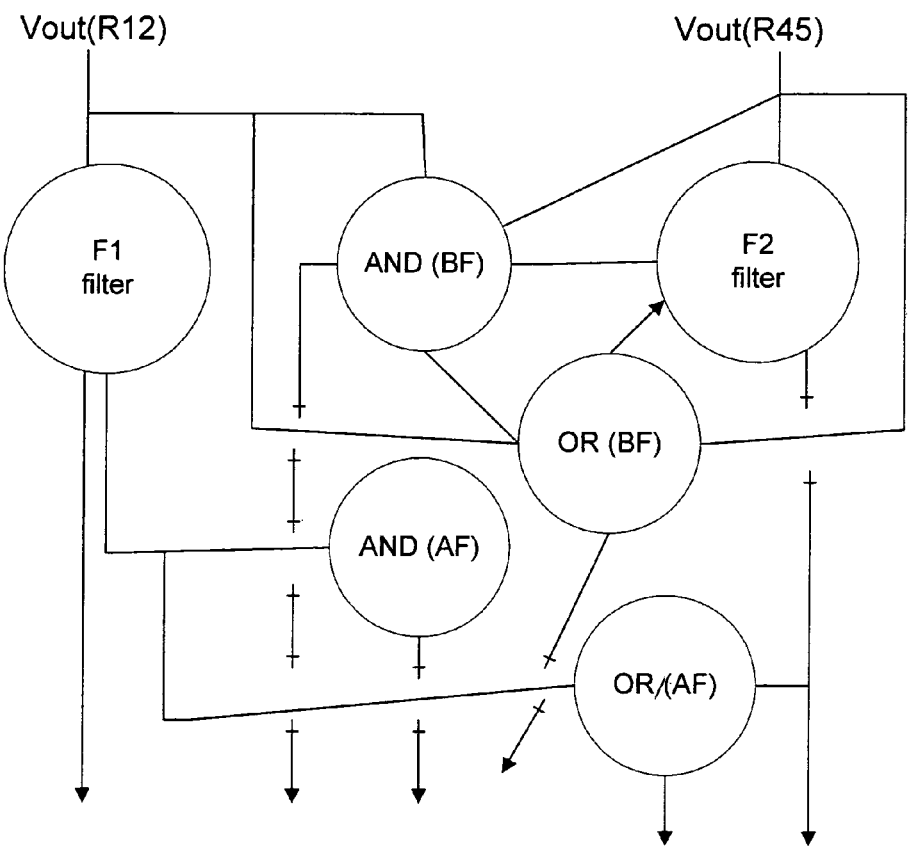
FIG. 12
FWD
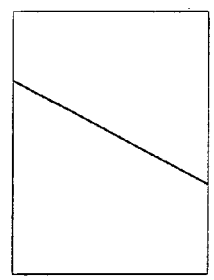
STOP
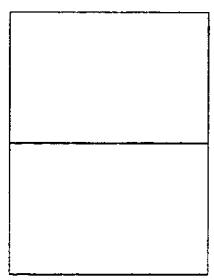
CHANGE
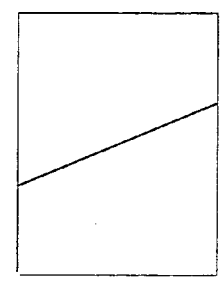
FIG. 13A  FIG. 13B  FIG. 13C
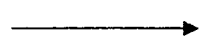  

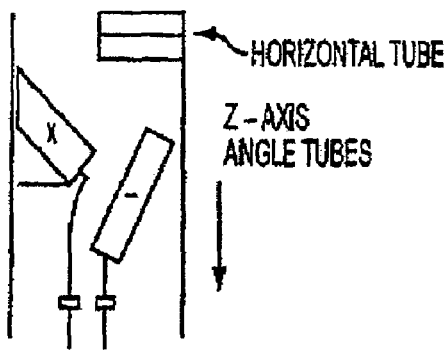
FIG. 31
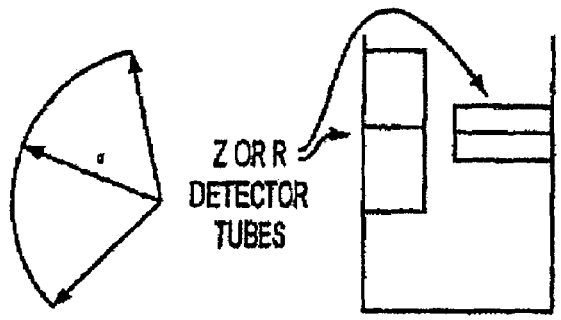
FIG. 32
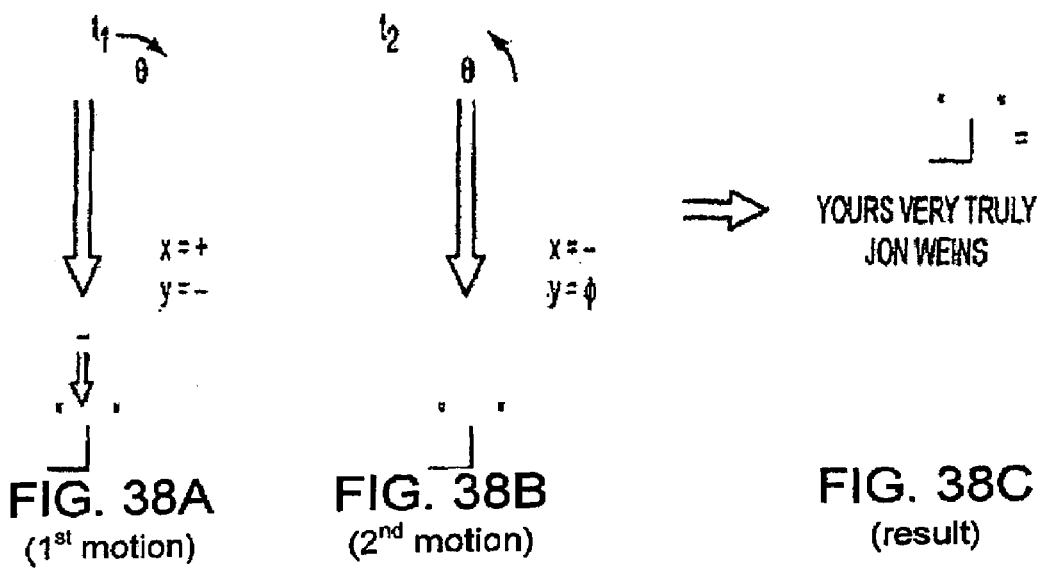
FIG. 38A (1st motion)  FIG. 38B (2nd motion)  FIG. 38C (result)

|  | $t_1$ | $t_2$ | $t_3$ | $t_4$ | $t_5$ |
|---|---|---|---|---|---|
| $x_1$ | + | + | + | 0 | 0 |
| $x_2$ | 0 | + | 0 | 0 | 0 |
| $y_1$ | + | 0 | 0 | + | + |
| $y_2$ | 0 | 0 | 0 | 0 | + |
| $z_1$ | 0 | 0 | 0 | 0 | + |
| $(z_2)$ | | | | | |
| $\theta_1$ | + | + | + | 0 | 0 |
| $\theta_2$ | 0 | + | + | + | 0 |
| $\gamma_1$ | + | 0 | 0 | 0 | + |
| $\gamma_2$ | | | | | |
| $\phi_1$ | 0 | 0 | + | + | + |
| $(\phi_2)$ | | | | | |

+ = EXCEEDS THRESHOLD

FIG. 33

|  | $t_1$ | $t_2$ | $t_3$ | $t_4$ | $t_5$ |
|---|---|---|---|---|---|
| $x_1$ | + | 0 | 0 | 0 | 0 |
| $(-) x_2$ | 0 | 0 | − | − | 0 |
| $y_1$ | + | + | + | 0 | 0 |
| $(-) y_2$ | 0 | 0 | 0 | 0 | − |
| $z_1$ | 0 | 0 | 0 | 0 | + |
| $(-) z_2$ | 0 | 0 | 0 | 0 | 0 |
| $\theta_1$ | 0 | 0 | + | + | + |
| $(-) (\theta_2)$ | | | | | |
| $\phi_1$ | + | 0 | + | + | 0 |
| $\phi_2$ | 0 | − | 0 | 0 | − |
| $\gamma_1$ | + | 0 | 0 | 0 | 0 |

(NET IN WRITING)

+ = EXCEEDS "+"
− EXCEED "−"
THRESHOLD

FIG. 34

A ⟹ "AT HOME"
B ⟹ "AT LARGE"
C ⟹ "OR 2434"
FIG. 35
A ⟹ R
B ⟹ D
C ⟹ B
FIG. 36
2-8 pm
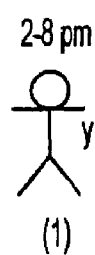
(1)
$q_p$-6a
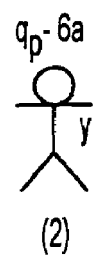
(2)
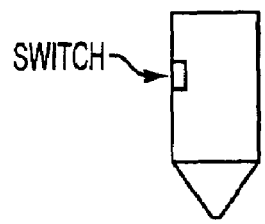
SWITCH
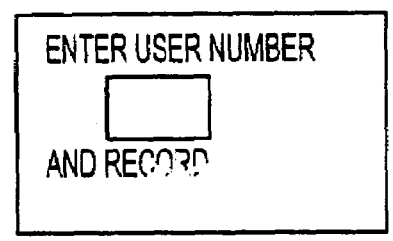
ENTER USER NUMBER
AND RECORD
FIG. 37

REAL MOTION DETECTION SAMPLING AND RECORDING FOR TRACKING AND WRITING INSTRUMENTS USING ELECTRICALLY-ACTIVE VISCOUS MATERIAL AND THIN FILMS

REFERENCE TO PRIORITY DOCUMENTS

This application is a continuation-in-part and claims priority under 35 U.S.C. § 120 to U.S. application Ser. No. 10/816,531 entitled REAL MOTION DETECTION SAMPLING AND RECORDING FOR WRITING INSTRUMENTS AND SMALL TRACKING INSTRUMENTS USING ELECTRICALLY-ACTIVE MATERIAL WITH VISCOSITY and filed Apr. 1, 2004, and incorporated by reference for all purposes, which claims priority under 35 U.S.C. §119(e) and incorporates by reference, U.S. Provisional Application 60/475,756 entitled REAL MOTION DETECTION SAMPLING, RECORDING AND RECALL FOR PENS AND TRACKING INSTRUMENTS filed Jun. 4, 2003 in the in the United States Patent and Trademark Office, herein for all purposes.

BACKGROUND

The digital pen by LogicTech is an example of a writing instrument that can record the movement of the pen in order to recall it electronically so that what is written by the pen can be easily digitized. The prior art digital pen includes an optical sensor or camera, which tracks the movement based on special "grided" paper. The pen is bulky and works with the special paper for recording purposes.

Other inventions for tracking motion have been numerous, such as which measure motion based on accelerometers or gyroscopes. These include patents assigned to Vega Vista, Inc. of Mountain View, Calif. which are hereby incorporated by reference and others. The use of accelerometers for motion in 3 dimensions is computationally difficult, especially on a minute scale. The tablet computer systems use various ways to track the motion of the stylus' but the motion detection is taking place through electronics in the computer screen and not the stylus and thus cannot be used independently.

What is needed however, is a compact tracking and recall system, which is portable and light and does not require special paper. Furthemore, the computational problems associated with standard movement devices accelerometers and gyroscopes makes internal calculation of movement more difficult, so the need for a simpler recording mechanism is apparent.

SUMMARY

The present invention details a system for tracking and writing motion internally to the pen (or other instrument) and communicating such motions to a general or specific purposes computer systems. In a preferred embodiment the present invention uses multiple tubes with electrically active material with viscosity surfaces in order to generate the necessary signals to determine the motion of the device in a targeted number of degrees, but may also supplement or complement the data with magetically active thin films. The data is then filtered and optionally processed and stored. The data then can be downloaded to a computer or other processing device to determine the motion of the pen or other tracking device.

BRIEF DESCRIPTION OF THE DRAWINGS

The present invention can be better understood by reference to the illustrations in which:

FIG. 7 is illustrative of the angles to be recorded in the present invention (for a six degree embodiment of the invention) in a recording pen;

FIG. 12 shows a filtering system for the sink with multiple logical signal generation;

FIGS. 13A-C show a sample of a moving detection tube and the effect on the electrically active viscous material;

FIG. 14 shows the rectangular detection system tube with a single power source contact;

FIG. 31 shows an alternate placement of a Z-axis detection tube;

FIG. 32 shows a second alternate placement of a Z-axis detection tube, allowing the Z-axis tube to function as an accelerometer measuring movement in an alternate coordinate system;

FIG. 33 shows a computational model of the present invention with a two-state system;

FIG. 34 shows an alternate computation model of the present invention with two types of two-state system (three-state system);

FIG. 35 shows a first training correlation scenario (two-state);

FIG. 36 shows a second type of training correlation scenario (three-state);

FIG. 37 shows a multiple user correlation;

FIGS. 38A-C shows the process of training a specialized symbol or "stenographic" training.

DETAILED DESCRIPTION OF THE DRAWINGS

Throughout the detailed description the term "fluid with electrical properties" or "electrically conducting fluid" is used. This term is meant to capture the spirit of the invention in that a viscous material is contacting a conductor in planar or conical wedge form on one or more faces. The resistance of the conductor will vary depending on the electrical properties of the viscous material. The viscous material may have other desired physical properties, such as changing viscosity based on electrical current, but such features are not critical to the present invention.

Figure 1:
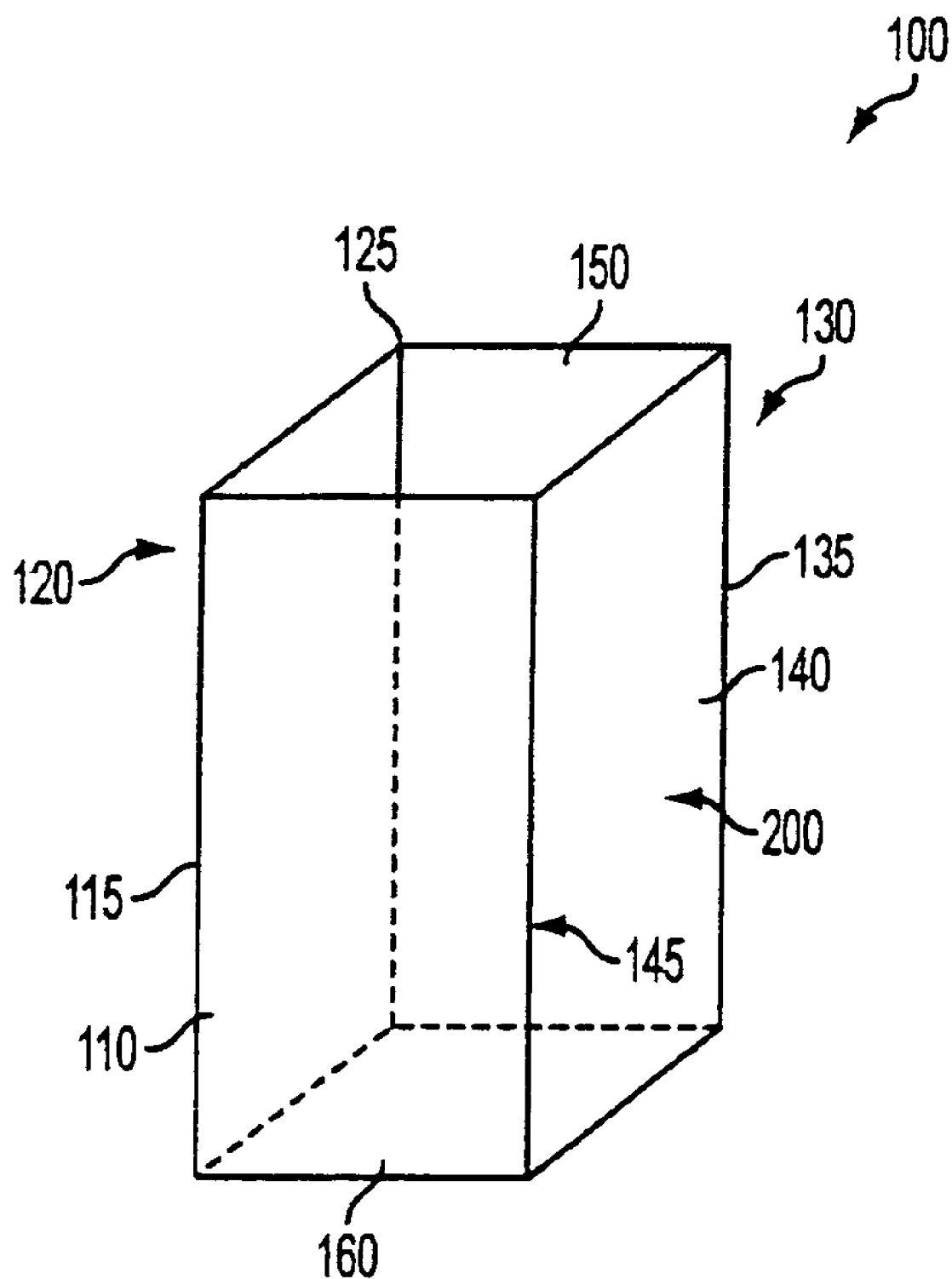
FIG. 1 is a hollow conducting rectangular tube as may be implemented in the present invention.

FIG. 1 is an illustration of the rectangular electrical motion detection tube 100 of an embodiment present invention. The tube 100 includes 4 conductive regions 110, 120, 130 and 140, with divider regions 115 (110-120), 125 (120-130), 135 (130-140) and 145 (140-110), surrounding a hollow space 200 which is preferably vacuum sealed at a desired vacuum pressure P(v). Top and bottom zone 150 and 160 also enclose hollow space 200. As will be discussed below, the rectangular tube 100 may be divided in several ways to improve the sampling of the motion detection. The conductive region may also be though of as a "resistive region" as well. The material making up the conductive region will best be a metal with some degree of resistivity and will be responsive to the electrically active fluid such that the conductivity or resistivity will change based on the amount of contact with the electrically active fluid.

Figure 2:
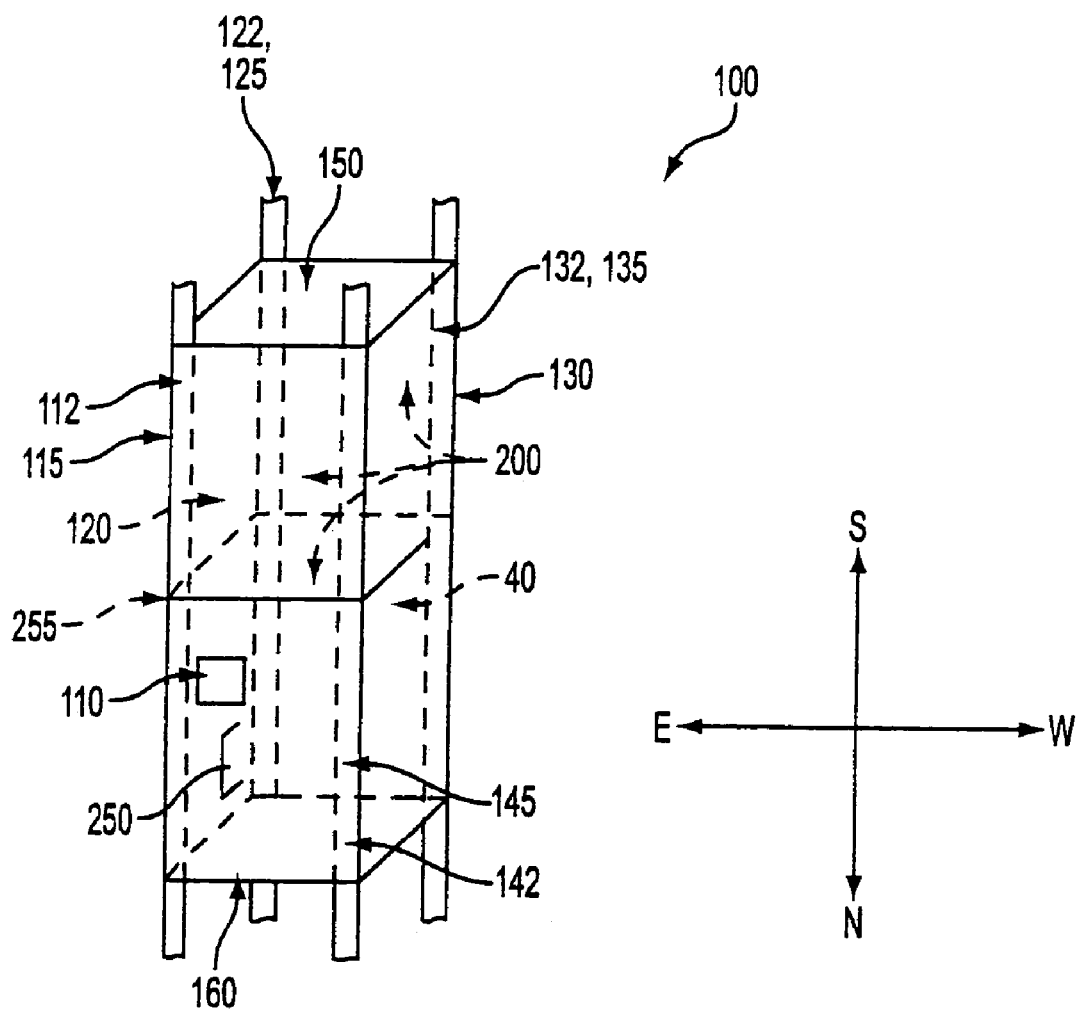
FIG. 2 shows the hollow conducting tube with 4 or more conductive regions, separated by insulators which house resistors.

FIG. 2 shows a first embodiment of the the motion detection tube 100' with conducting regions. Along divider regions 115, 125, 135, 145 is a resistive strip 112, 122, 132, and 142 surrounded by an insulator (not shown). Hollow space 200 is filled with a fluid with desired electrical properties 250 to fluid level 255 before being vacuum sealed to a desired pressure P(v).

Figure 3:
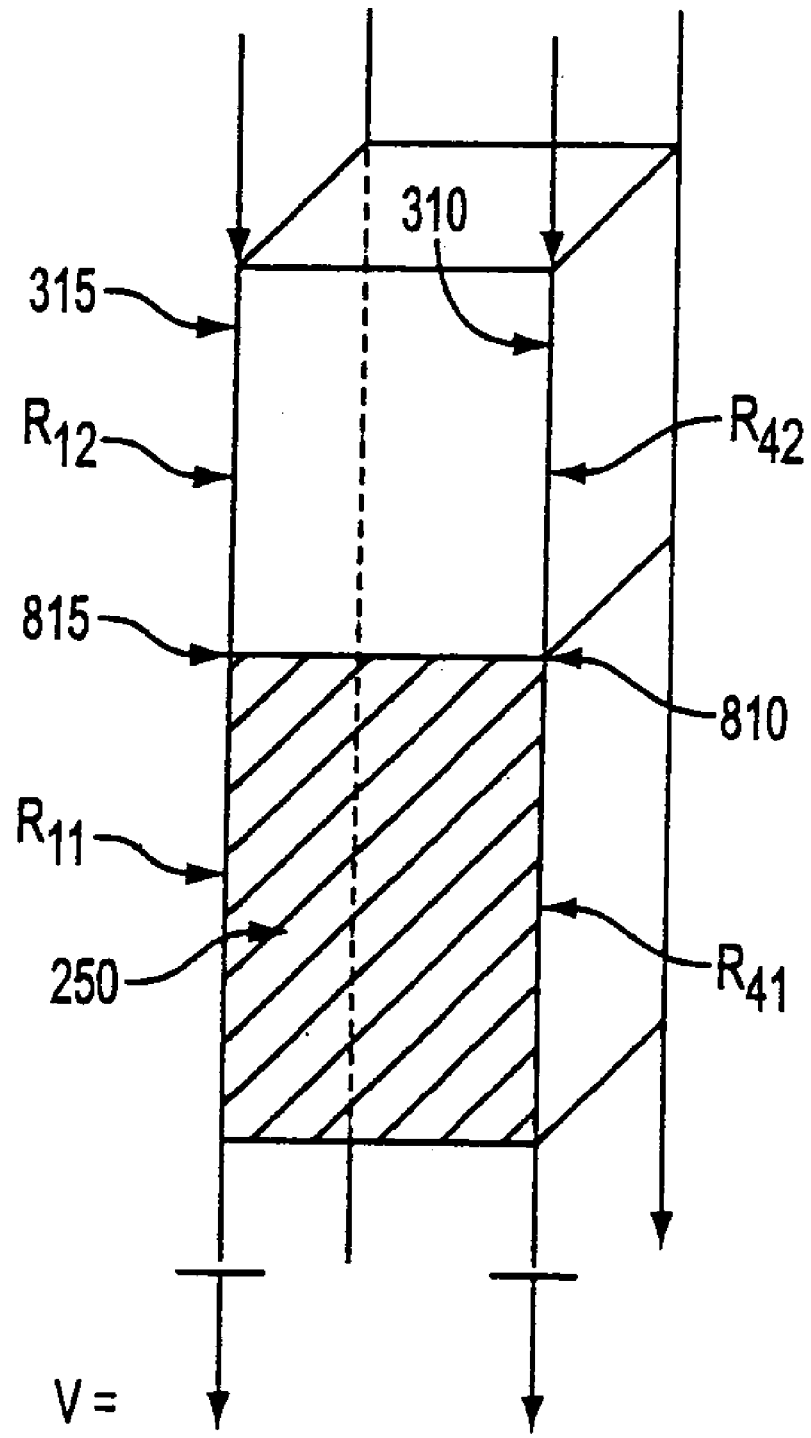
FIG. 3 illustrates the operation of the present invention due to the change in the resistance of individual measuring region, due to the change in the conducting fluid level.

FIG. 3 shows a sample of the detection system of the present invention. Each resistor 112, . . . 142 on a conductive region 110 . . . 140 has two resistive zone properties. The edge of the first zone, R11, R21, R31 (not shown), and R41, shown as 815, 825, 835, and 845 respectively, is the level of the resistor below the electrical manipulating fluid level 255. The second zone R12, R22, R32 and R42, shown as 315, 325, 335, and 345 respectively is above the fluid level 255. The regions of the conductive zones 110 . . . 410 below the level 255 are marked as 810 . . . 840 and the regions above as 310 . . . 340, each with conductive property C11, C41 . . . and C12 . . . C42 (not labeled), respectively.

Figure 4:
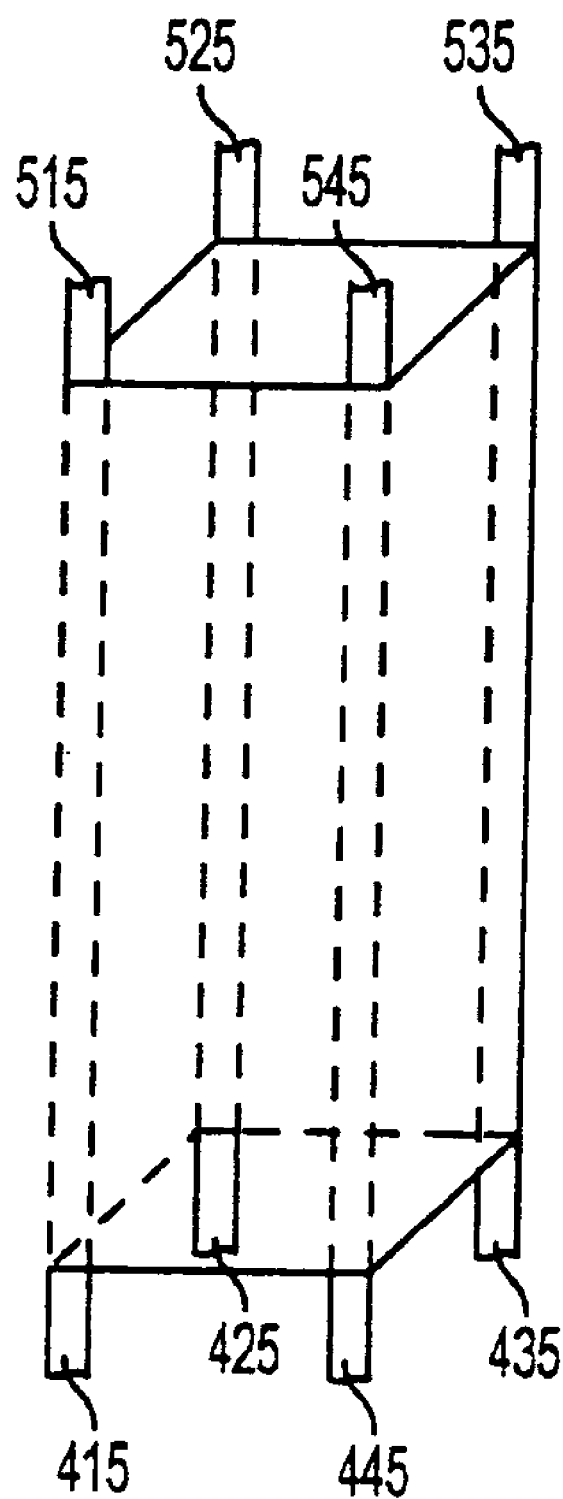
FIG. 4 illustrates an alternate embodiment where the regions are divided down the center of each rectangular region.

Referring now to FIG. 4, in a particular embodiment of the detection tube, electrical sources 515, 525, 535, 545, respectively, contacting resistive strips 112, 122 (not shown), 132, and 142, respectively are shown. Electrical sinks 415, 425, 435 and 445 also contact the strips 112 . . . 142 respectively. Although, the power source and sink connected to the resistive strip is one embodiment of the detection tube, in other embodiments the conductive region may be used or both the conductive and resistive regions can be used.

Figure 5:
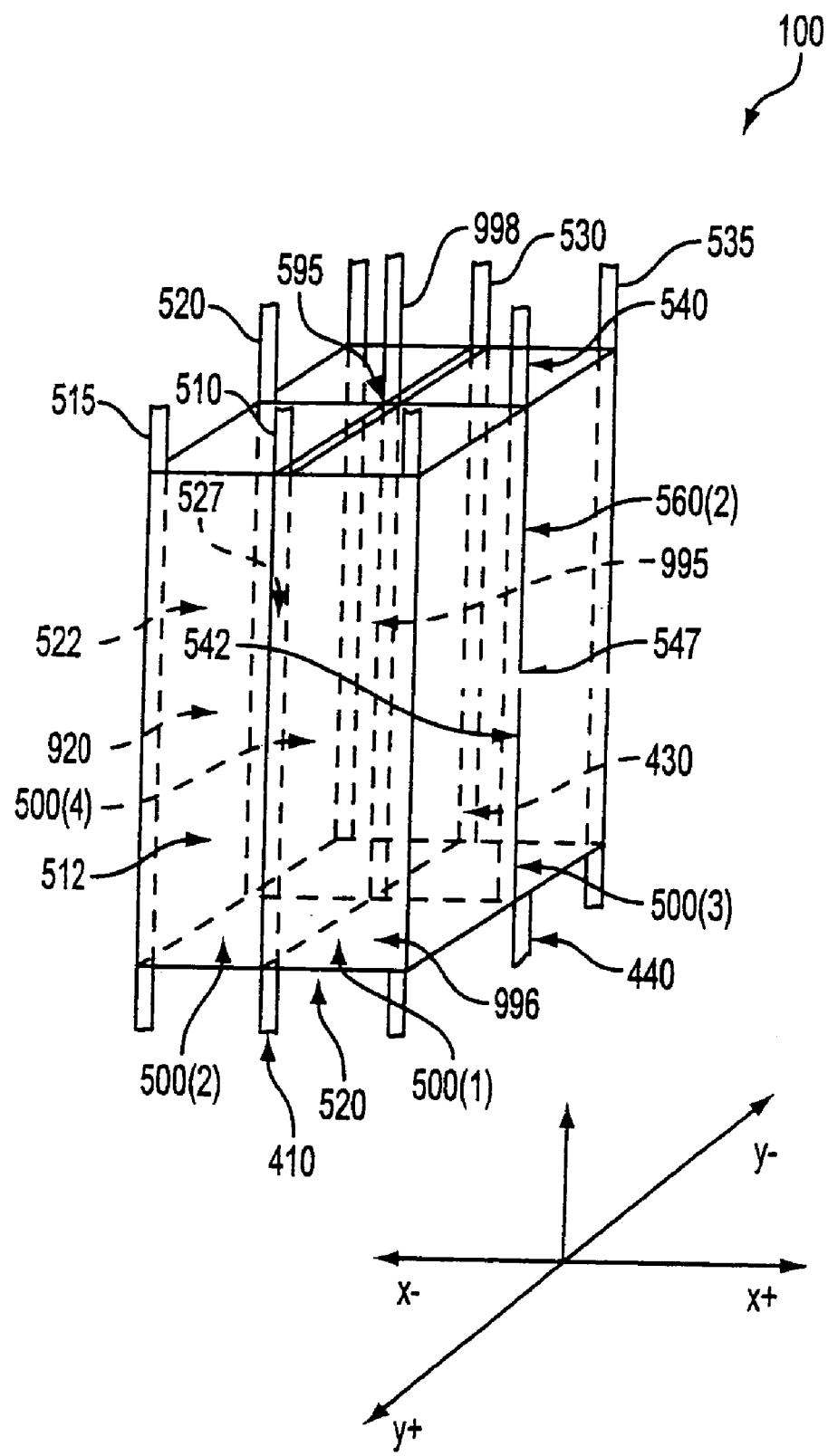
FIG. 5 shows the connectors to the source and the recording sink.

FIG. 5 shows an optional internal regional insulating or conducting divider 595 dividing the hollow space 200 into 4 individual rectangular cylindrical spaces 500(1) . . . 500(4). Also included are center resistive power sources 510, 520, 530 and 540, and sinks 410, 420, 430, 440, each of which is connect to a center resistive strip each of which has positive regions 512, 522, 532 and 542 and negative regions 517, 527, 537, 547, respectively. Also shown is an optional central power source 998 and sink 996 connected to a center resistor 995 with up to 8 regions 995(512), 995(517), 995 (522), 995 (527) . . . 995(547), which may correspond to the counter part positive or negative center resistive strip 512, . . . 547 as may be appropriate.

Figure 6A:
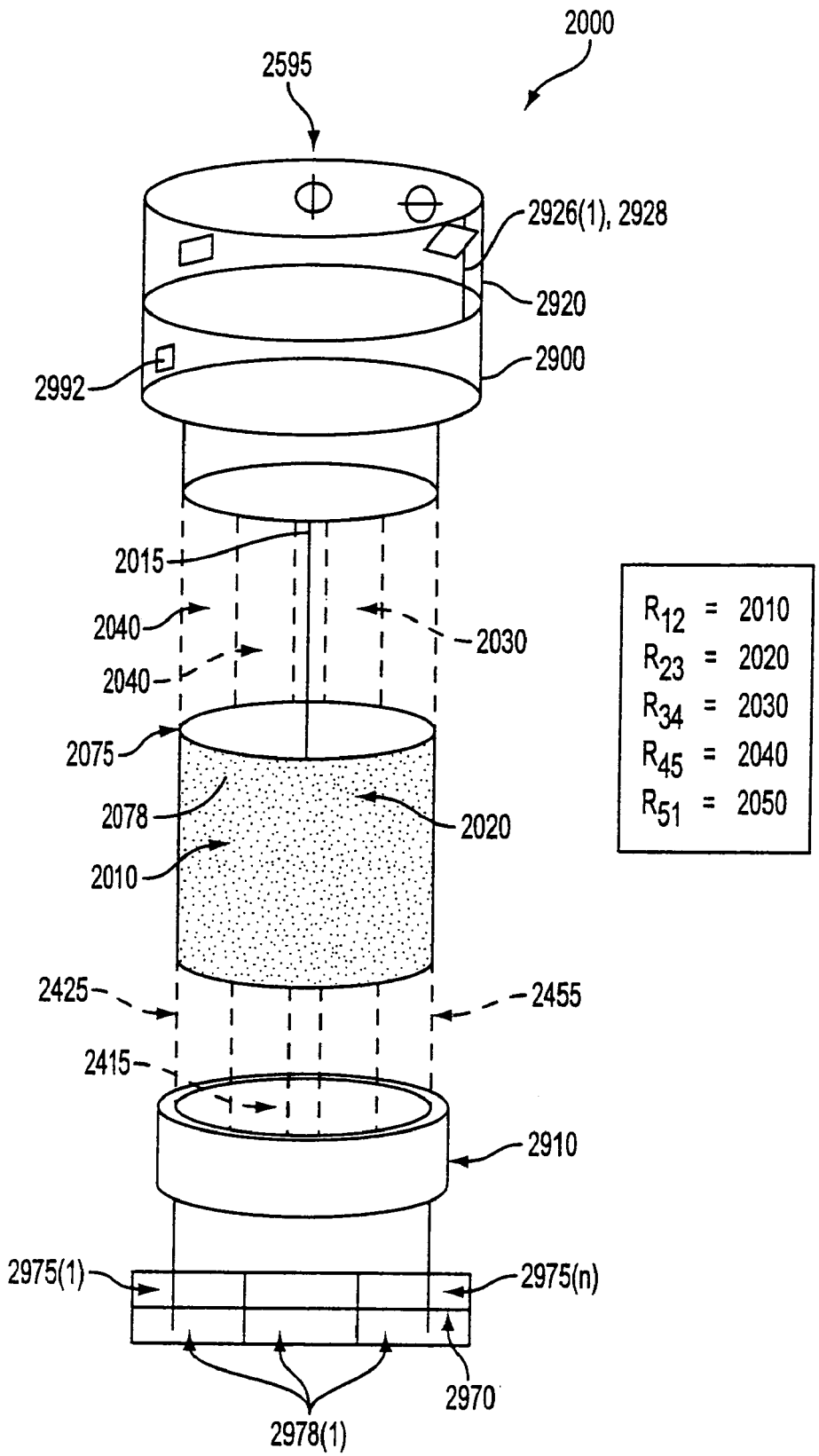
FIG. 6A illustrates a cylindrical embodiment of the motion detection tube with 5 conductive regions.

As can be appreciated by those skilled in the art, alternate shapes of the detection tube may used as correspond to the natural motion detection needs of the final use of the device. FIG. 6A illustrates an alternate cylindrical embodiment of the invention 2000 with 5 semi-circular regions 2010, 2020 . . . 2050 and divider regions 2015 . . . 2055, resistive strips 2012 . . . 2052 much in a non-rectangular arrangement similar to the rectangular tube 100. The regions 2010 . . . 2050 surround hollow space 2200 with a electrically manipulating fluid 2250 filled to level 2255. Power source(s) 2300 are connected to regions 2010 . . . 2050 and strips 2012 . . . 2052 by source connections 2515 . . . 2515 much in the same manner as the rectangular tube 100. Sink connections 2410 . . . 2450 are also connected to the strips 2012 . . . 2052. Although 5 regions are used in the present invention, other numbers of regions may be used as needed by the final intended use.

Also shown, are the pulse generator and initialization computation device 2200 which generally controls the power source(s) 2900. The pulse generator 2920 has a least one clock 2926(1) . . . 2926(n) and may have a separate clock generator for each connection 2515 . . . 2555, to the resisitve strips 2015 . . . 2055 or other connection 2510 . . . 2550 that run through the detection cylinder 2000. Power source 2900, may be connected to an external battery 2990 through a connection 2992 directly or throught the pulse generator 2920.

A collecting sink 2910 also collects the electrical currents passing through the appropriate connections (i.e. 2410, 2015, etc.). A collecting sink 2910 is detailed later but also may have a separate clock 2912 and a voltage filtration system 3000, which may filter out voltages that do not meet an activation or retardation threshold, depending on the requirements of the final use of the device. A digital recorder 2970 includes at least one storage module 2975 include RAM or EEPROM, but preferably solid state storage. Also included is an optional external connection 2978, which in a preferred embodiment is a transponder which can be read wirelessly, but in an alternate embodiment is a mini USB port or firewire port which is connected at the top of the pen or other convenient location.

Figure 11:
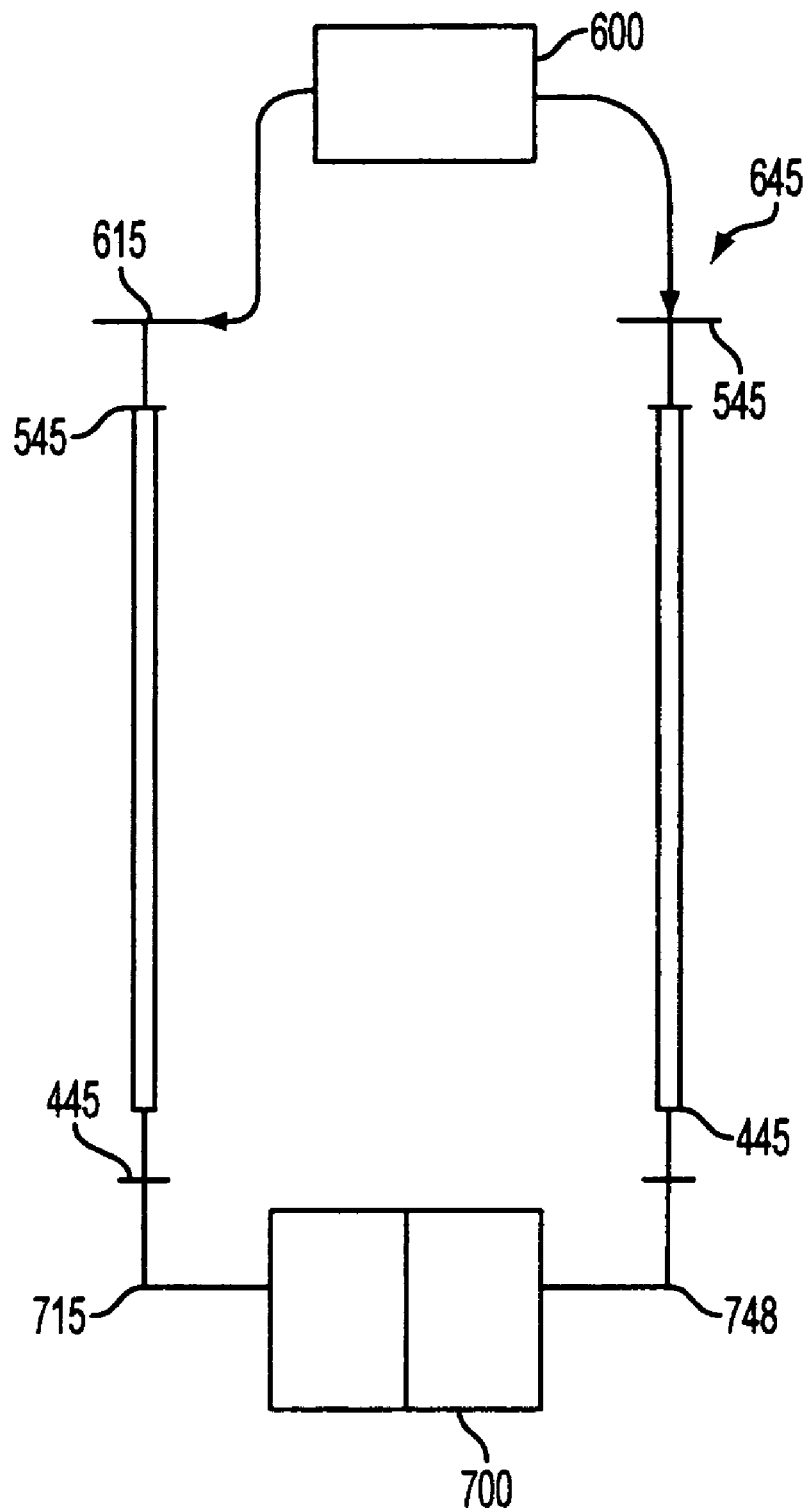
FIG. 11 depicts the measuring tube with 2 virtual resistors attached to a filter and/or computational device.

The rectangular counterpart to the cylindrical invention 100 is shown in FIG. 11. Also shown is an optional one or more gyroscopes 1250 in computational device 1200. A mini USB device or firewire port 1275 may be connected to the upper region of the detection system to facilitate efficient data transfer and ergonomics.

Figure 6B:
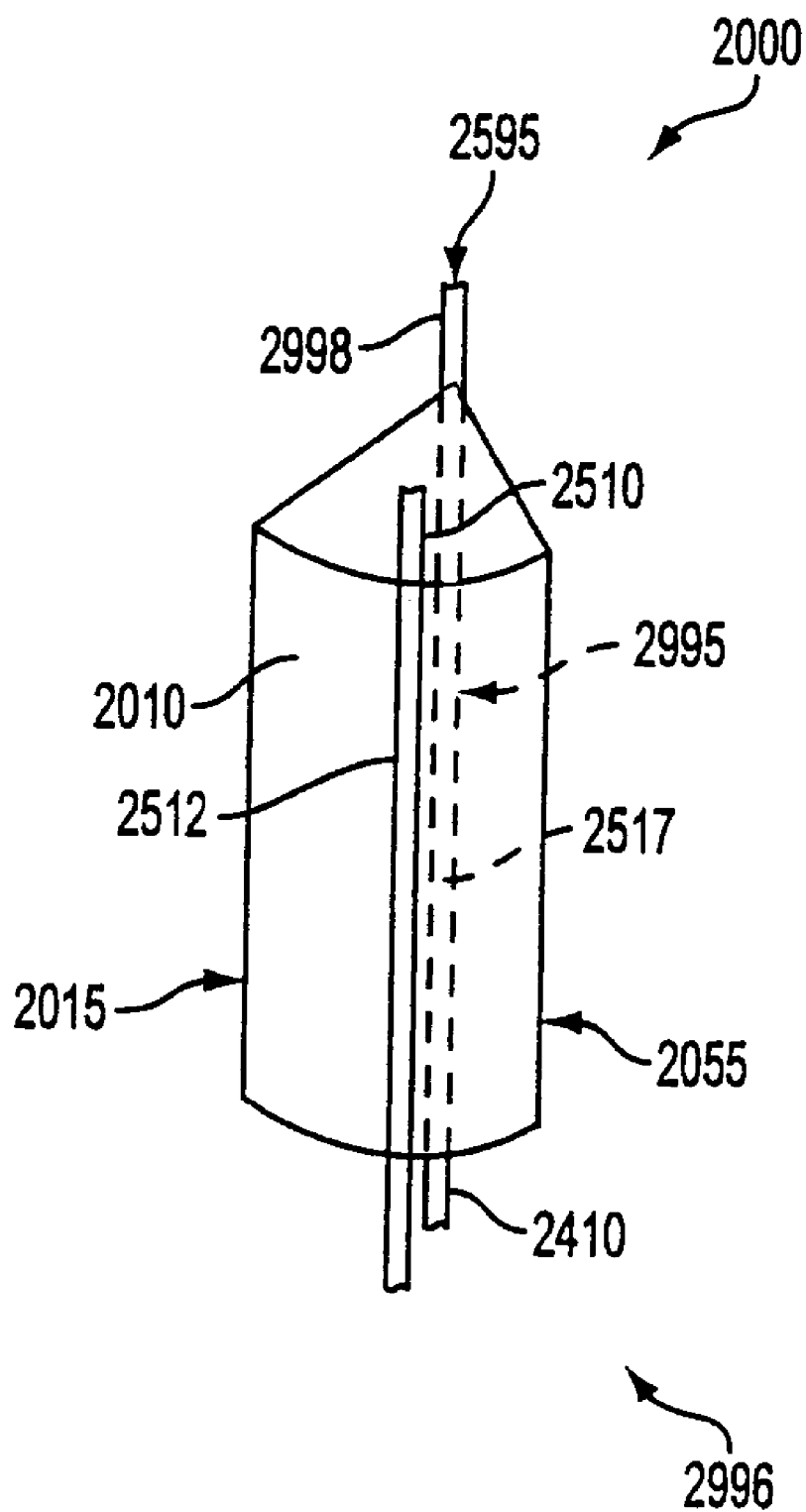
FIG. 6B shows a single cylindrical detection tube for the cylindrical conductive regions.

FIG. 6B shows an optional center barrier 2595 acts in a similar manner to the rectangular space divider 595 to divide the hollow space 2200 into 5 spaces 2500(1) . . . 2500(5). A single cylindrical portion 2010 is shown for purposes of simplification. There are similar connections 2510 as to those in the rectangular embodiment. A center power source 2998 and sink 2996 are also connected to a center resistive strip 2995 with 10 zones (2995 (2522), 2995 (2527) . . . ) similar to the rectangular embodiment. As can be appreciated by those skilled in the art, the number of zones can be varied as needed from the final use of the pen or tracking instrument. For example, the cylindrical tube may have six regions (each covering 60 degrees of arc) instead of the 5 depicted in FIG. 6A. The more regions the more "degrees of freedom" that can be measured. However, too many regions may be counterproductive and create too complex a set of signals to benefire from the manufacturing economy provided by the invention.

Figure 17:
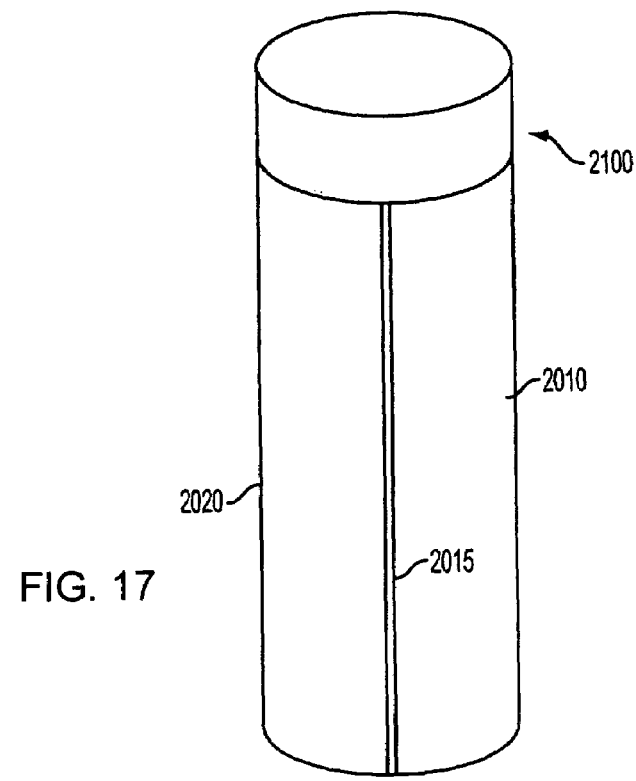
FIG. 17 shows the cylindrical detection system tube with a single power source contact.

Referring now to FIG. 17, it is also contemplated that the electrical source may be a single band 2100 connected to the top of the cylinder 2000. This reduces the amount of electrical components needed and is still efficient as the voltage differences at the sinks are the measurements that need to be recorded for the preent invention. The rectangular version of this is shown in FIG. 14 with single source band 99 connected to all the resistive and conductive regions.

Figure 8:
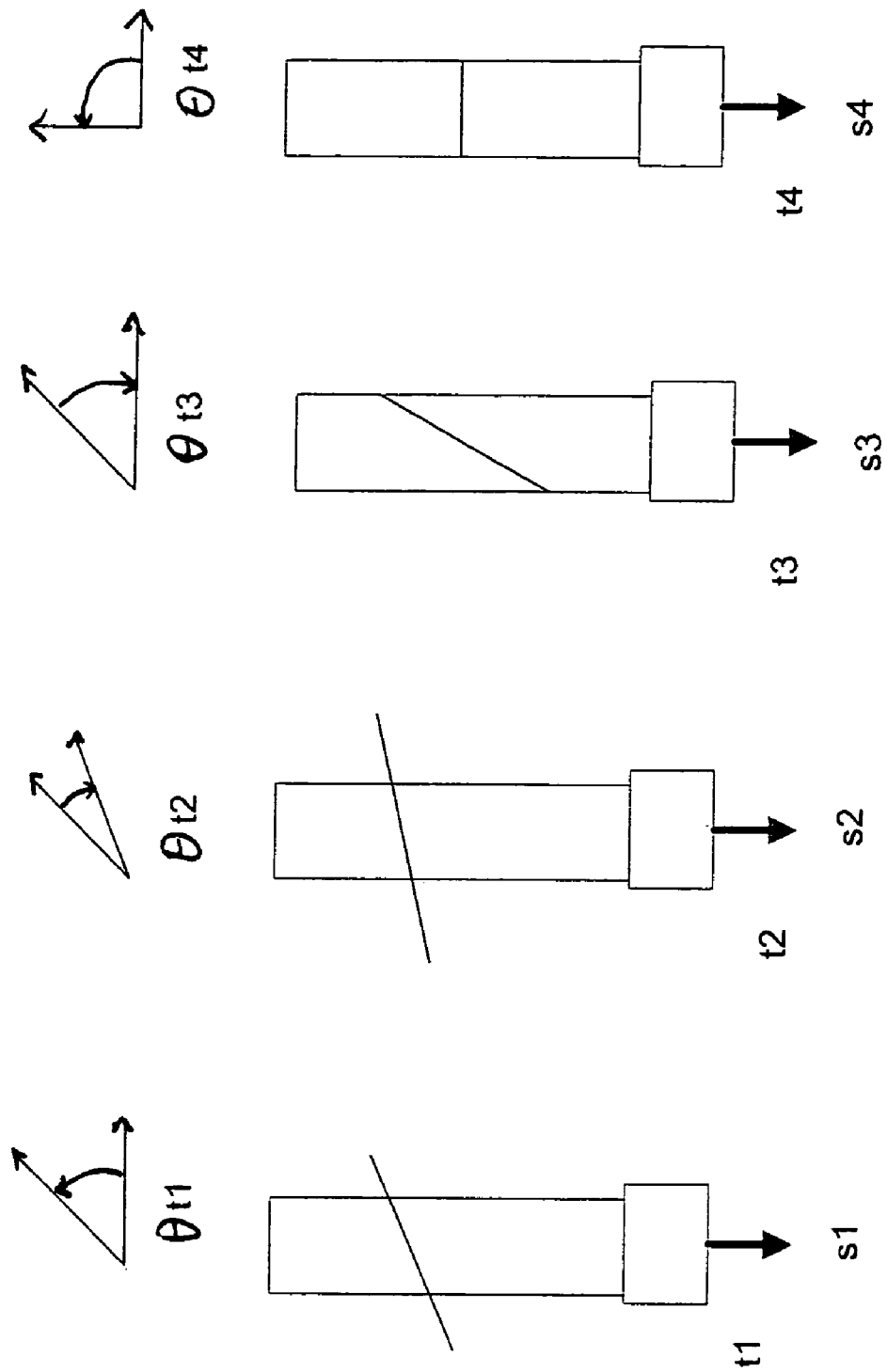
FIG. 8 shows the time recording of individual motion as implemented in the present invention (for 4 time slots) for a single degree of freedom (theta)

FIG. 7 represents sample descriptions of the (three) angles or degrees of freedom to be calculated for each time t(x) to determine the angle a which the user is holding and moving the pen 2. These are degrees of freedom 4-6 and greatly assist in reducing problems with calculation of movement based on the voltage variances without adding much complex circuitry. However, FIG. 8 is a simple representation of the processing of one angle in FIG. 7 (theta) which is tracked at all point (t(x)) so as to be able to calculate motion effectively. It should be noted that movement in the z (up and down) is expected to be minimal (as well as in the phi rotation) and, as such, only 4 measurements really needed to determine the recorded motion of the pen 2.

Figure 9A:
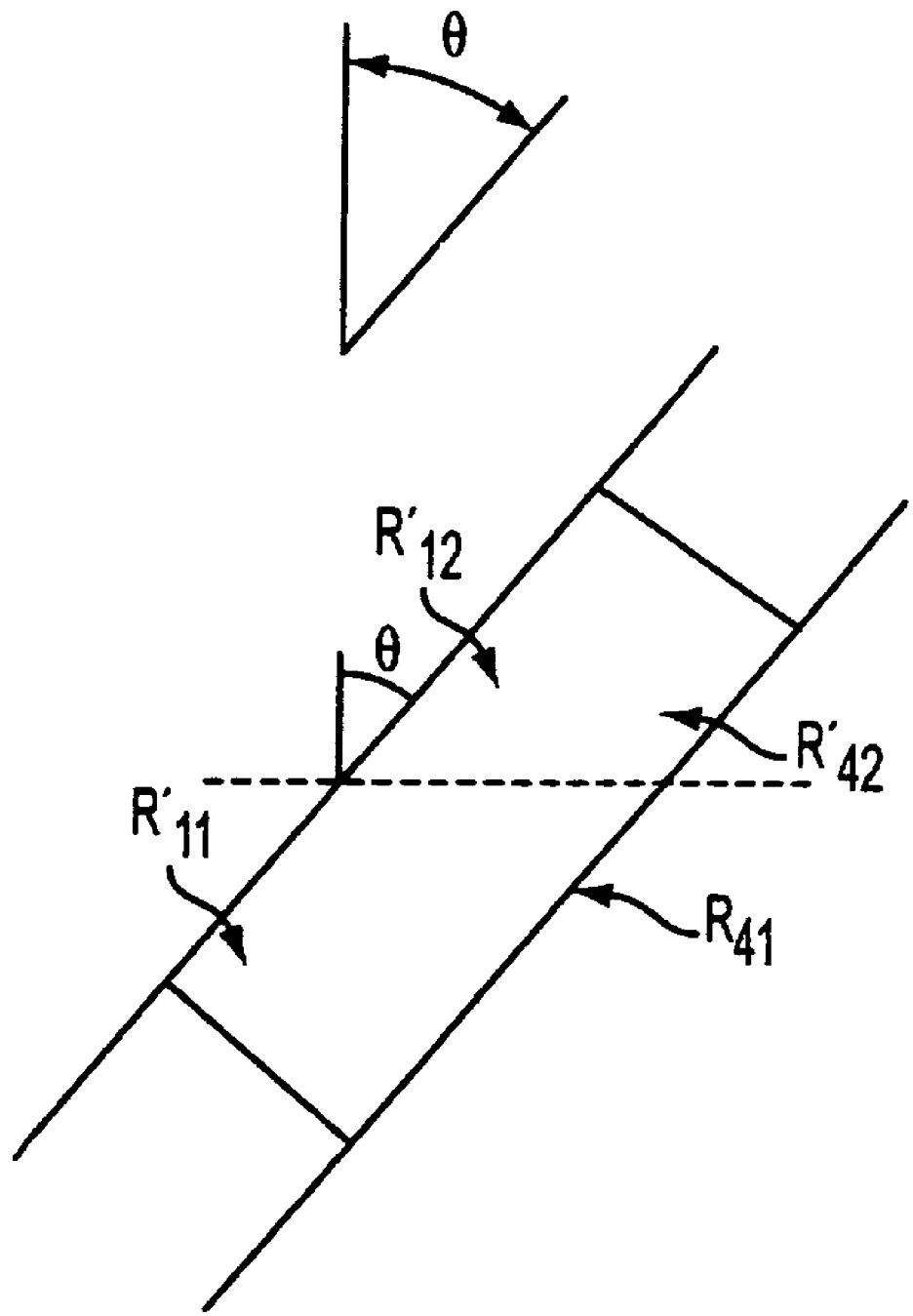
FIG. 9A shows the change level of the conducting fluid level in the rectangular body on one user motion which can detect or measure an axis of motion or rotational motion in the device to be tracked.
Figure 9B:
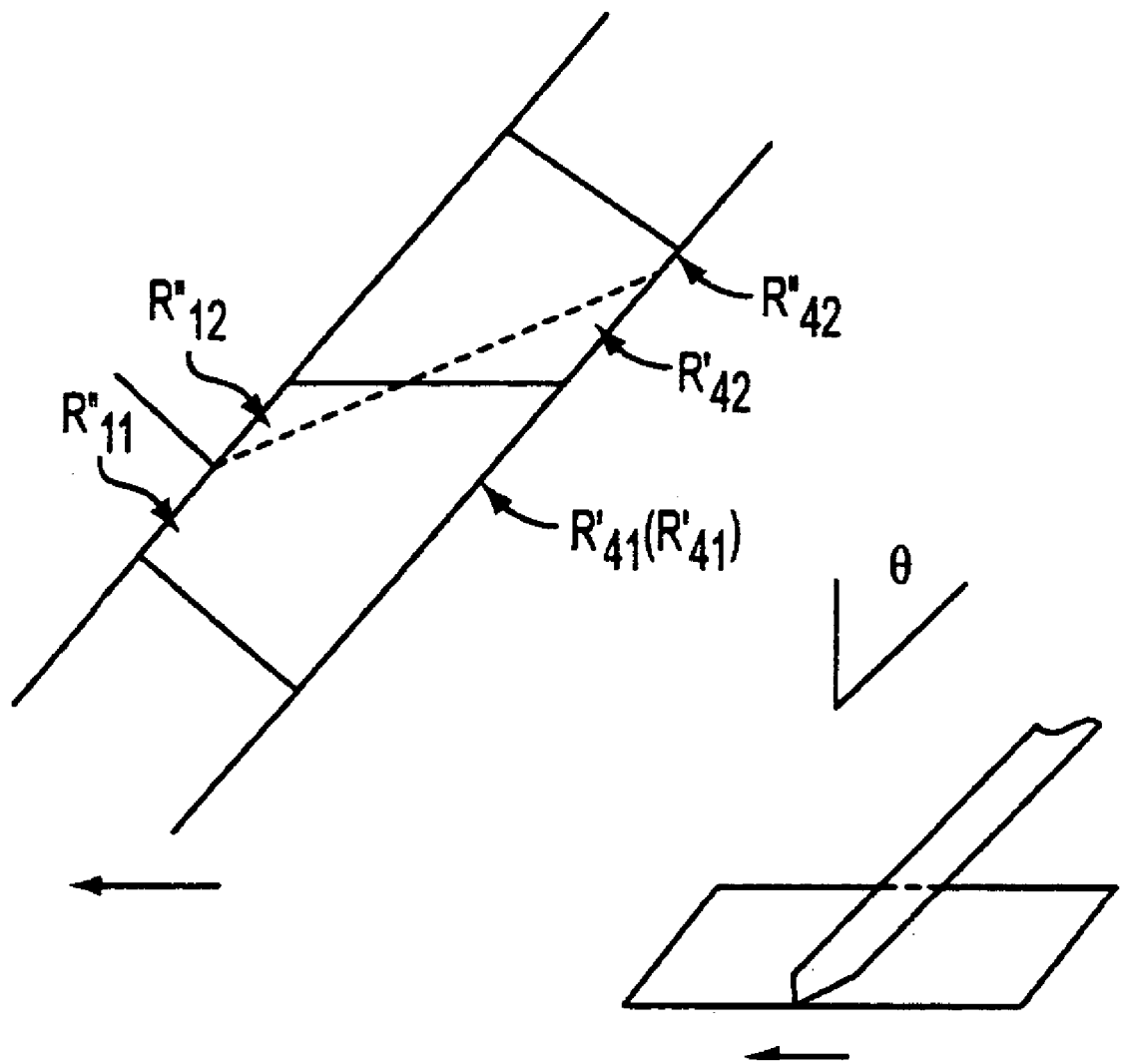
FIG. 9B shows the differential change level in one dimension on two resistive regions.

FIG. 9A is an illustration of the differences created in the two regions R'(11) R'(12) etc based the movement of the pen or recording instrument in one axial or angular direction (x in this case). Thus the viscosity acts like a accelerometer in one instance (axial) and a gyroscope or tilt measurement in other instances (cylindrical or spherical) The angle theta is representative movement of the pen creating a temporary change in the angle of the fluid 250 and creating a voltage variance in the R'11+R'12 resistor from the R'42+R41 resistor. This configuration takes place at time t(init). FIG. 9B represents movement of the cylinder 100 or 2000 in one direction in FIG. 9A at a time (t(init)+1 unit). This creates another voltage differential to be processed by unit 2900.

Figure 10:
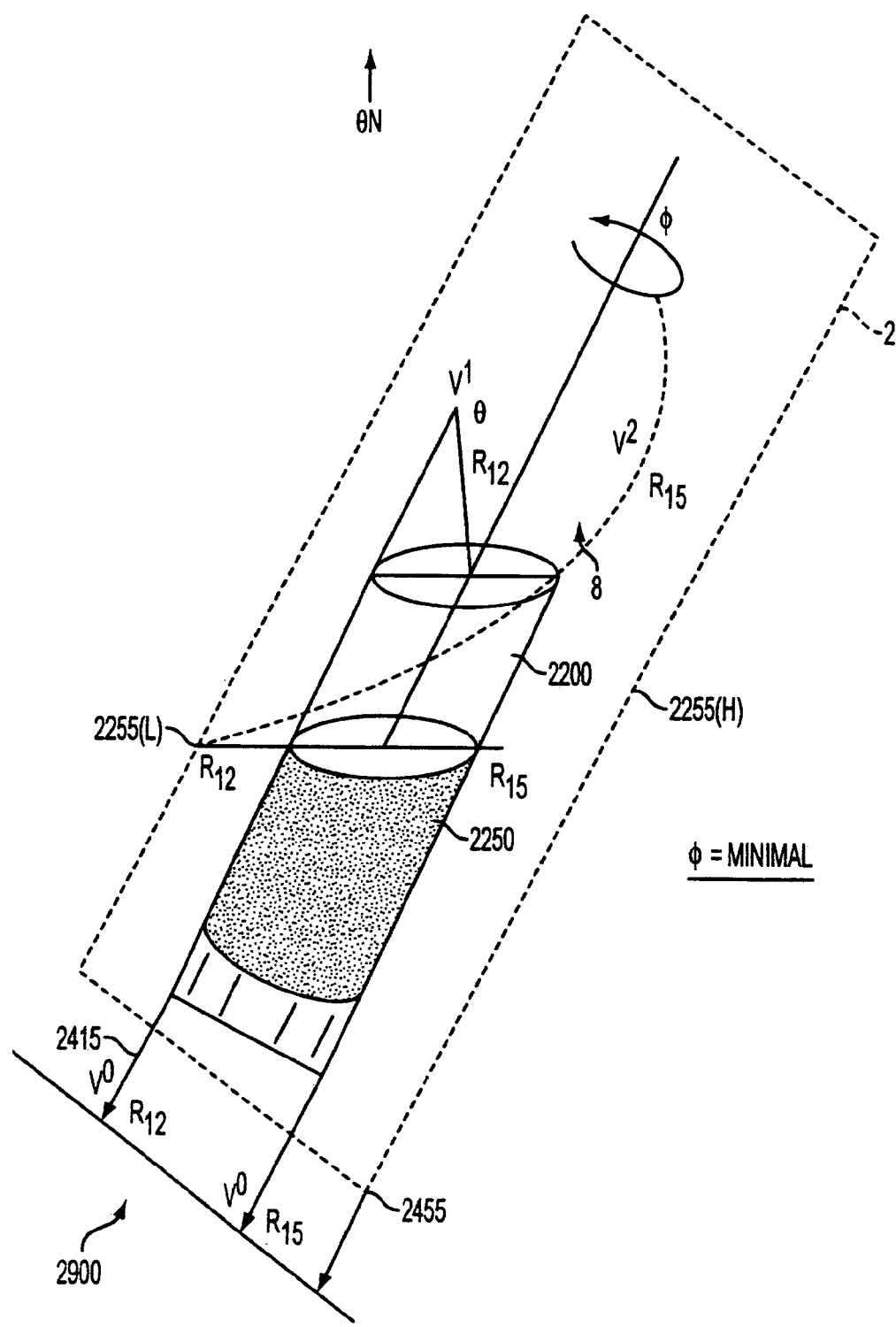
FIG. 10 shows the change level of the conducting fluid level in the cylindrial body on one user motion which can detect or measure 3 angles of the device to be tracked.

FIG. 10 shows the basic electrical operation of the cylinder motion detection and recording component 2000 for one degree of freedom. When a pen or tracking device 2 is tilted at angle theta (A(I)) from the normal (theta (N)), the fluid 2250 in chamber 2200 moves with the pen 2, creating at least two electrically active fluid levels in two respective regions (in this case R12 and R45 is shown) 2255(L) and 2255(H) respectively, but may be any combination of regions depending on the end use of the device and the accuracy needed. In measuring the rotation of the device Phi tends to less important for a pen 2, but may be important in other devices. The differences of the outputs V(out)R12 and V(out)R45 depends on the properties of the electrically manipulating fluid 2250, but the voltage will now be distingsuishable. The sink 2900 collects the two voltages through connections 2415 and 2455, respectively and can process them in the voltage screening system 3000 to record the data for theta (A(I)) at time (t) based on the two voltages. Alternately, if so desired a transisitor may be placed between the two outputs requiring a threshold of either V(out)R12 or V(out)R45 when compared. This is shown in FIG. 12 with multiple output configurations.

FIG. 11 represents a sample functional schematic of embodiments in which connections 615 and 645 carry a pulse from one or more clocks 600 (in unit 2200) to the voltage differential processing unit 700 in the form of the detection tubes (described in FIGS. 1-6C) which may have one or more voltage threshold filters 715 . . . 745).

FIG. 12 also shows how a filtering unit may be implemented in one or more embodiments in a logic sequence. Two filters F1 and F2 operate on the output V(o)R12 and V(o)R45 from two sides of a detection tube (not shown). The output may be combined before filtering in an AND gate, it may be combine before filtering in an OR gate or the signals may be combined after filtering. Of course, FIG. 12 simply demonstrates a very simple model, but other operators, such as comparitors, XORs, NOTs, NANDs, multiple threshold filters may be used in any combination that is appropriate for the proper signal generation as can be appreciated by those skilled in the art. In a alternate embodiment the logic for determining the proper signal may be a PFGA or other device that may be adjusted or trained.

FIGS. 13A-C show a simplified version of the sample detection tube moving in a particular direction, stopping, and changing direction. The electrically active fluid will continue to move forward as the pen stops and changes direction 13B and C. Thus, the filter will be able to determine that the pen has changed direction from the resulting voltage changes from 13B to 13C. Most likely this change will be slightly delayed due to the physical nature of the viscosity of the electrically active fluid.

Figure 15:
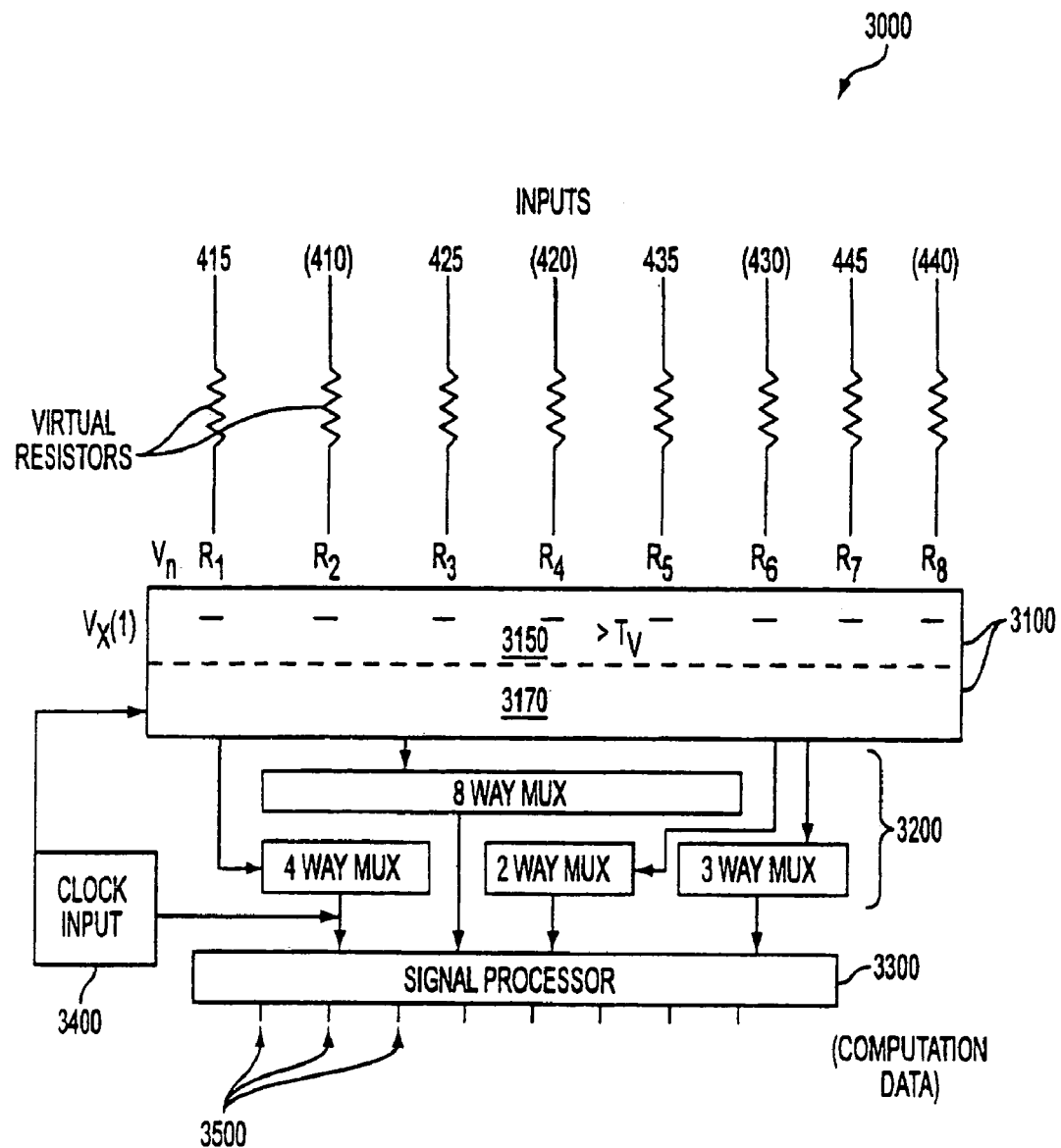
FIG. 15 shows a sample embodiment of an optional internal processing system for detection signal processing.

FIG. 15 is a sample of the voltage differential processor 3000 which may be in the form of an ASIC or embedded software. A sample of 8 inputs are processed by filter 3100 which may include a threshold zone 3150 eliminated all voltages less than a determined threshold for non-meaningful movement of the pen 2, eliminating needless processing. Module 3170 can time stamp all inputs with a pulse from the clock 3400 that may be based on the clock in unit 2200. It may also be effective by giving only digital output based on the 8 inputs. Thus, the optional multiplexer complex 3200 may located inside the module 3170 or external if the module is only an analog processor or other type of filter/signal processor (i.e. normalization, etc.). The output for at least 4 degrees of freedom is put inside an optional signal processor 3300 which can optionally calculate each value for the degree of freedom and send it to storage via output 3500 based on the time stamp in 3170 or in the signal processor 3300.

Figure 16:
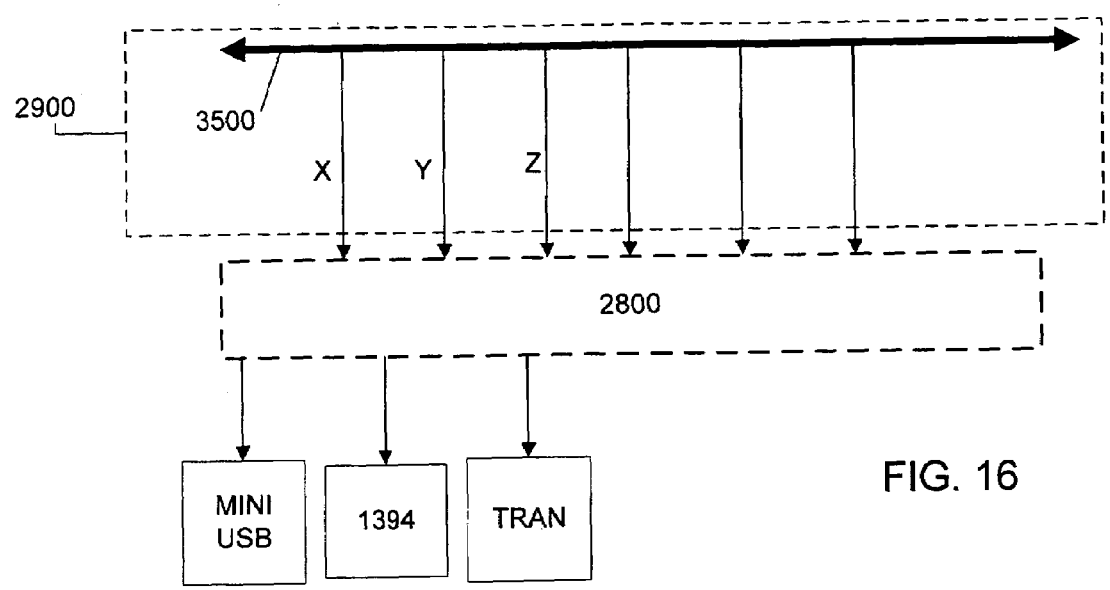
FIG. 16 illustrates a storage and output schematic for a particular embodiment of the motion recording system.

FIG. 16 illustrates storage of a single recorded degree of freedom in the storage 2800 through an optional interface or translator 2850. The storage 2800 can store each degree (shown as x, y, z, theta, phi and alpha or gamma) data separately or together, but for common storage, the degree the data is relating to need to be marked in the module 3170 or the signal processor 3300. The data is ported upon request (not shown) or schedule to a port for processing in a computer (mainly a PC) running a recording and calculation program shown as a mini USB or a 1394 firewire connection. A transponder TRAN is optionally another way to transport data to a computer capable of processing the data for each degree. Such that the pen may be placed against another device to download the data on the motion of the pen or other tracking device.

Figure 18:
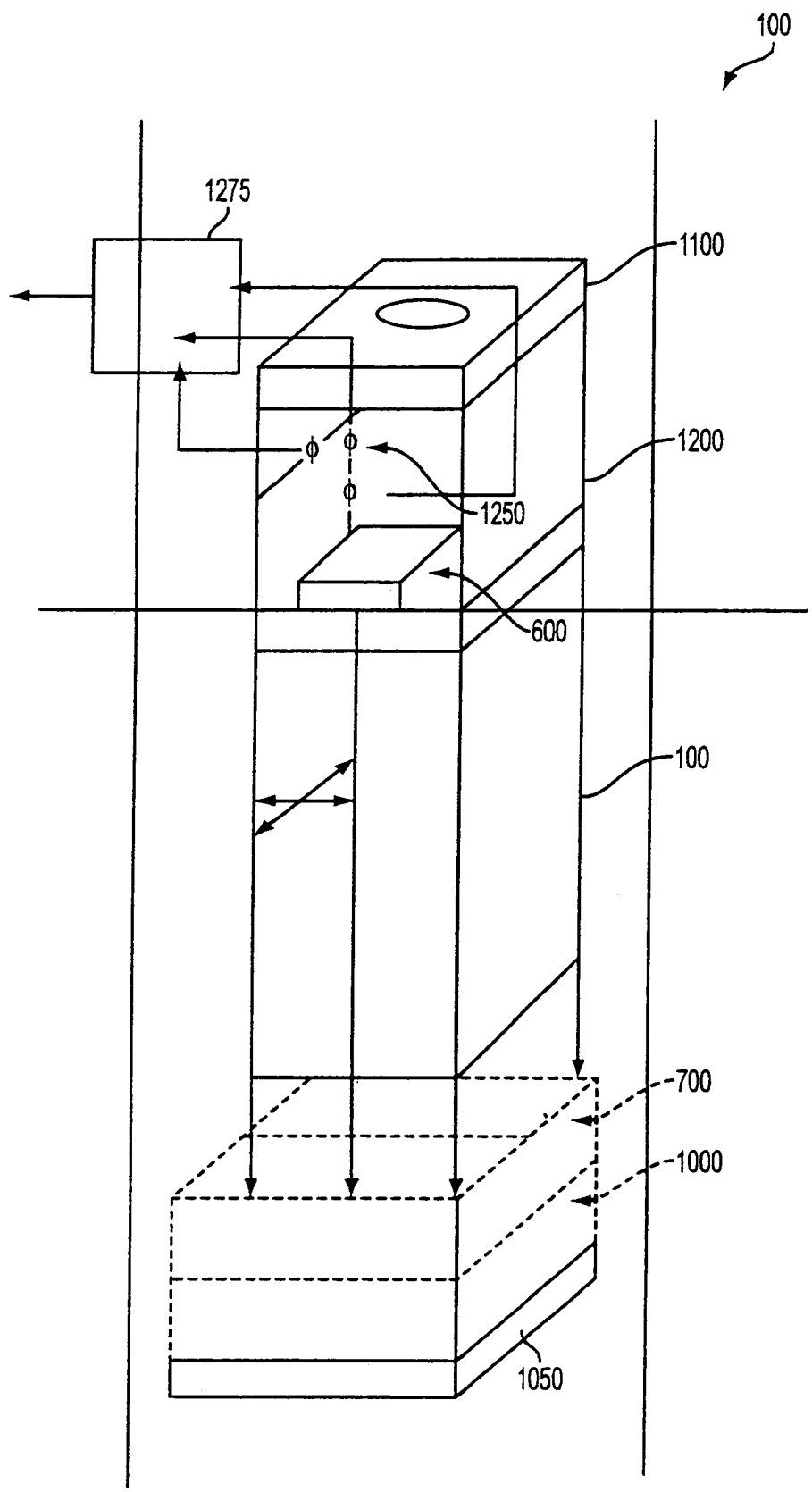
FIG. 18 shows the measuring cylinder with a source and a sink recording and computational model as implemented in a pen or other recording instrument.

The rectangular counterpart to the cylindrical invention 100 is shown in FIG. 18 in the pen 2. Also shown is an optional one or more gyroscopes or thin film magnetic field detectors 1250 (for measuring theta, phi and alpha or gamma) in computational device 1200. A mini USB device or firewire port 1275 may be connected to the upper region of the detection system to facilitate efficient data transfer and ergonomics.

Those skilled in the art will recognize that certain structures when considered from a functional viewpoint may be substituted with added functioinality depending on the intended end use of the recording pen. For example, the detection tubes may be thought of as accelerometers with added functionality (they also may act as gyroscopes without changing the structure). However, embodiments of the present invention are contemplated in which a combination of structures, especially magnetically active thin-films and detection tubes may improve the signals provided for the computational functions of the present invention.

The magnetically-active thin films can provide information regarding the pen or tracking device as it moves with regard to the earth's magnetic field. This may provide the computational portion of the invention with the "parameters" for determining the motion of the pen when data is provided from the detection tubes.

Figure 19A:
FIGS. 19A and B show a single surface with a magnetic thin film from a side and front view, respectively.
Figure 19B:
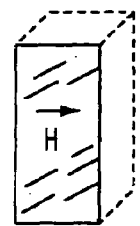
FIG. 19C shows a functional diagram of the magnetically active thin-film surface.

Referring now to FIGS. 19A and B, a sample magnetic thin film H(xbar) is shown from a side and front view, respectively. The thin film will be made of a material that has a magnetic field property in which the field will change as the film is rotated in the plane (or other coordinate system) of the various planes.

Figure 19C:
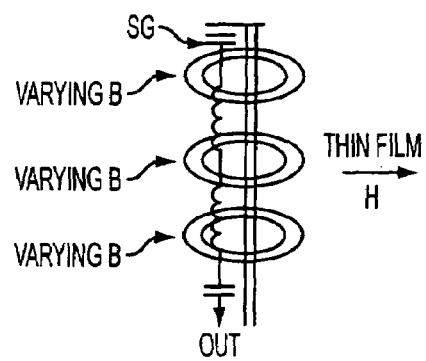

FIG. 19C shows a sample functionality of the electrical signal system related to the magnetically-active thin film. An electrical signal is passed or pulsed through a signal generation coil or field SG. The signal generation coil is then modified by the magnetic field Bbar(x) of the thin film H(xbar) producing an output signal (Out) which then may be filtered or processed in the manner similar to that discussed above.

Figure 20A:
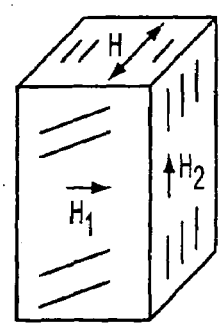
FIG. 20A shows a sample pen or other recording instrument with three visible magnetic thin film surfaces with three different axial orientations.
Figure 20B:
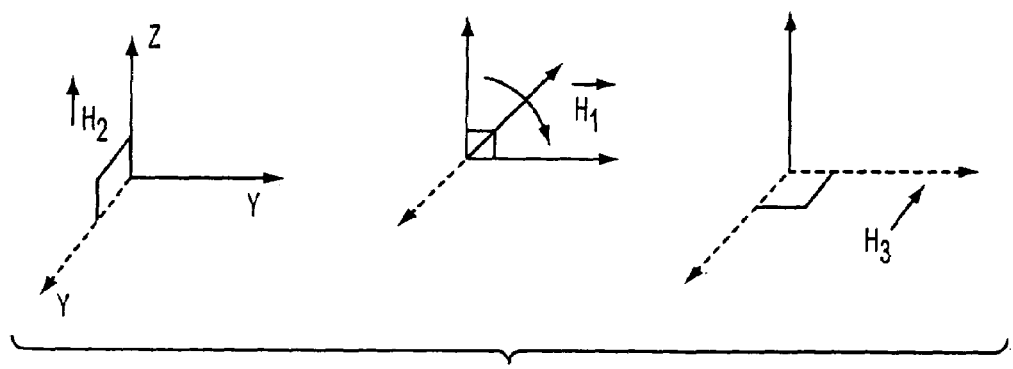
FIG. 20B illustrates the three axial rotation measurements of the three magnetic thin films shown in FIG. 20A.

Multiple magentic field variances may be used to determine the position of the pen or tracking device. This is shown by FIGS. 20A and B. In FIG. 20A the detection strip has three representative thin films each in which the magnetic field change in response to changes to three rotations. FIG. 20 B shows that Hbar(1) or H(xbar) measures the rotation of the device to the to the XZ plane (or tilt), Hbar(2) or H(ybar) measures the rotation of the device in the direction of the YZ plane (or spin) and Hbar(3) or H(zbar) measures the rotation of the device in the XY plane (or rotation).

Figure 21:
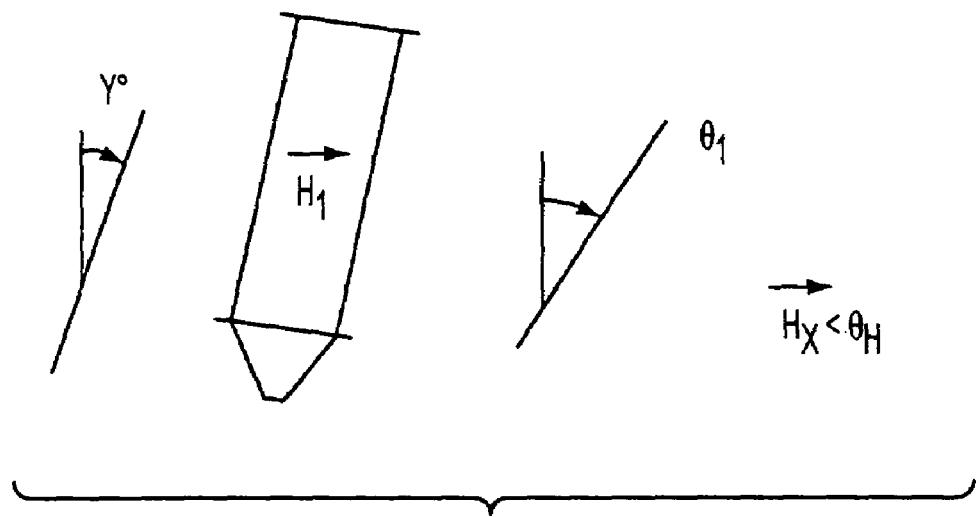
FIG. 21 shows a static electrical state when a sample magnetic thin film is at equillibrium or parallel to surface or less than a first threshold angle.

FIG. 21 illustrates how a thin-film magnetic field may be used to generate a signal for a angle of movement in a single direction. Hbar(1) or H(xbar) is activated when the thin film responds to the tilt angle. The signal production (not shown) may be in the form of a minature magnetic coil or pulsed electrical signal on the underside of the thin-film Hbar(1). The the magnetic field changes enough to produce a signal (filters are not shown but may be considered analogous to those discussed in FIGS. 12 and 15 above. If the tilt angle of the pen exceeds that of theta (Hbar(1)), a signal is produced indicating that the pen has reached the appropraite tilt angle.

Figure 22:
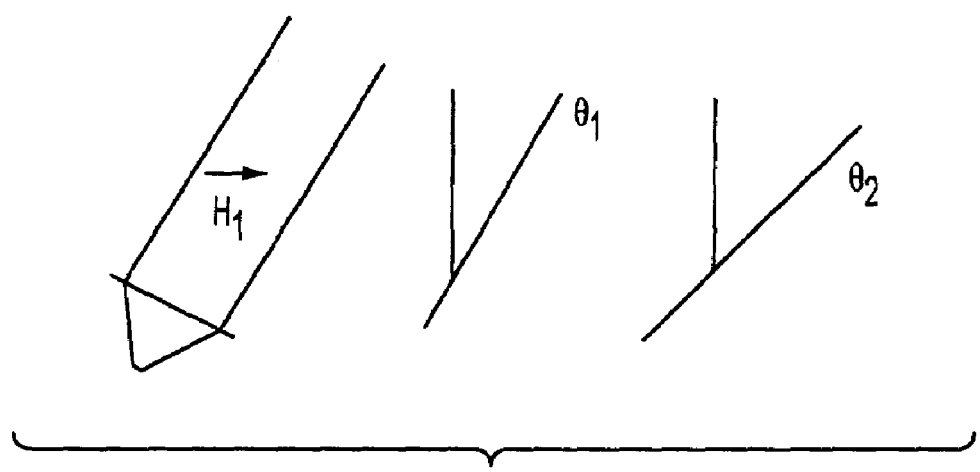
FIG. 22 shows two magnetic thin film surfaces having reached activation levels by being tilted at threshold angles theta1 and theta2 respectively.

Of course, it is useful that the invention be able to record multiple angles of the device. However, recording each electrical or magnetic field may be computationally improbable and require a level of circuit and digital complexity that forces that cost of the tracking device to exceed that which is desires for consumer or commercial use. Therefore multiple discrete angle measurements or angle thresholds as shown in FIG. 22 may be one configuration that provides the needed information without the complex circuitry. Hbar(1) causes at least two signals by being tilted at theta(1) and theta(2), respectively. This multiple threshold also allows the recording device to be "trained" for use by different users. For example, one writer may hold the pen at much less of tilt angle than a second writer. Therefore, the delta between theta(1) and theta(2) will be much less for the first writer in order to accurately detect the motion for both writers. Training of the computational aspects of the pen or tracking device is the subject of a co-pending application and will be discussed briefly below.

Figure 23:
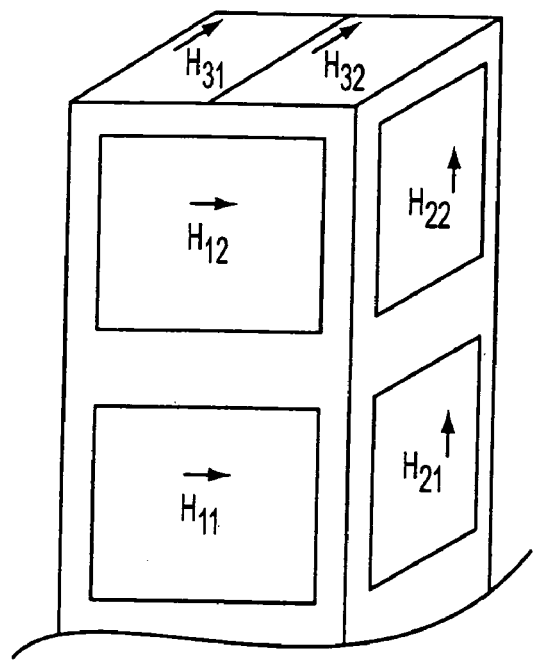
FIG. 23 illustrates various divisions of adjacent or closely-placed magnetic thin film surfaces to detect the motion of the pen or other recording device.
Figure 28:
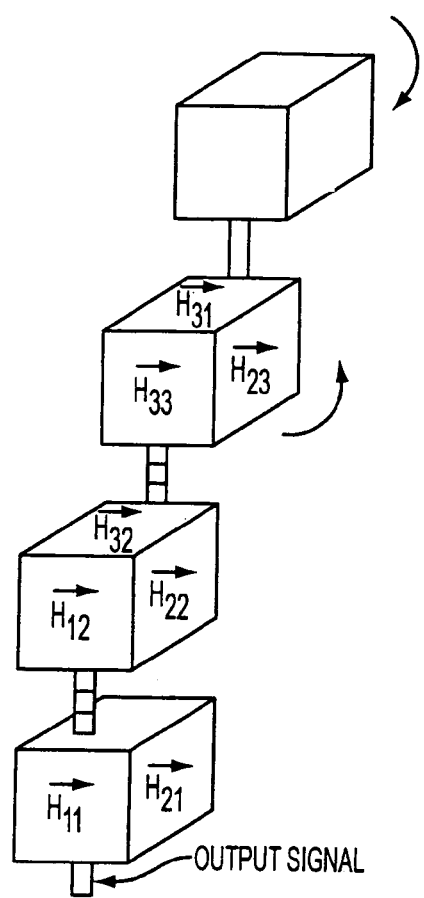
FIG. 28 shows the use of magnetically-active thin films on a multiple piece tracking device.
Figure 29:
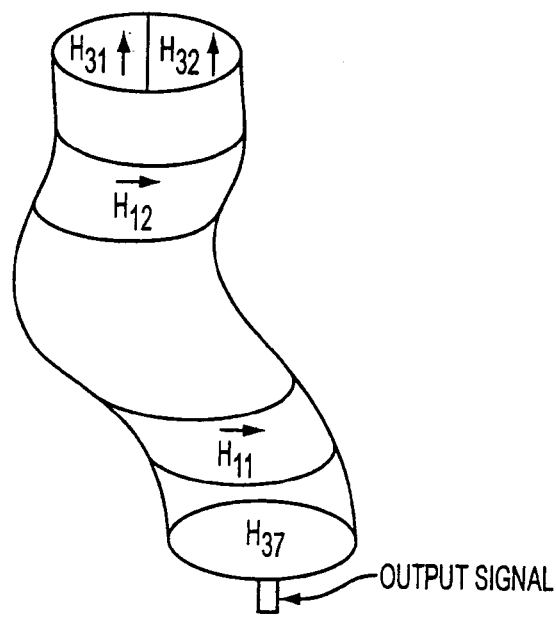
FIG. 29 illustrates the use of magnetically-active thin films on a flexible tracking device.

Although multiple thresholds for a single thin film, which may be considered for the detection tube with electrically-active viscous material as well, may prove to be complex in smaller tracking instruments. An alternative or complement is shown in FIGS. 23-26 in which multiple magnetically-active thin films may be placed at multiple location on the pen or tracking device to determine the "rotational" motions. FIG. 23 shows a pen with three sets of adjacent magentically-responsive thin films. Hbar (1,1) and Hbar (1,2) measure tilt angle (discussed above), but at two different locations. Hbar(2,1) and Hbar(2,2) measure spin at two different locations, however, this will likely not be needed in the writing instrument embodiment of the invention as the pen is likely to have the "same spin" at all locations. As can be appreciated by those skilled in the art, this is not necessarily the case with a tracking instrument that may consist of multiple or flexible sections. Hbar(3,1) and Hbar(3,2) measure two different rotations, which also may not be needed in a single rigid writing instrument. A multiple portion tracking instrument is shown in FIG. 28 and a flexible tracking instrument is shown in FIG. 29.

Figure 24:
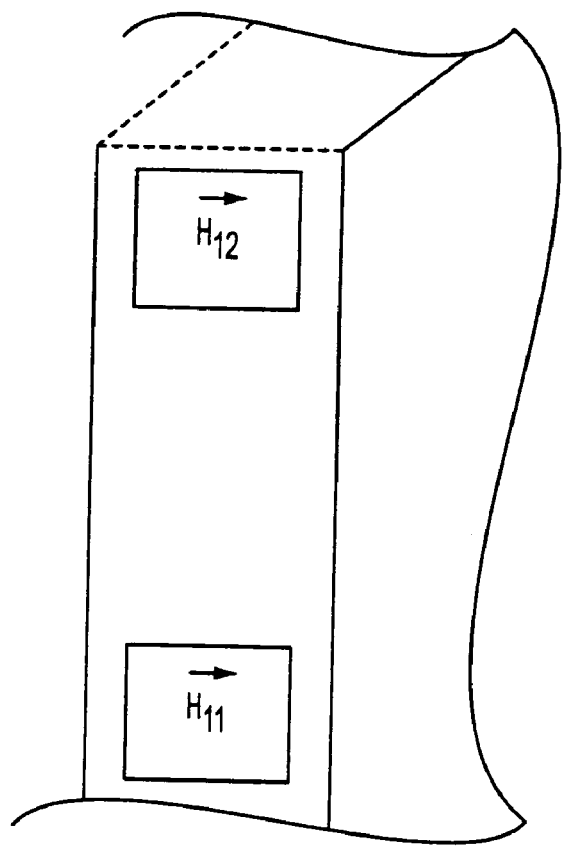
FIG. 24 illustrates magnetically-active thin films placed at different locations on the writing instrument.
Figure 25:
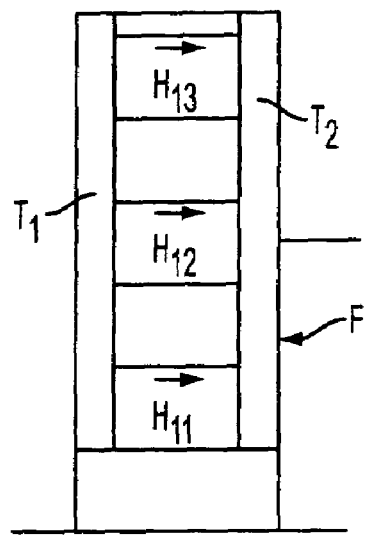
FIG. 25 illustrates the use of multiple magnetically-active thin films or electrically-varying detection tubes to determine a fulcrum.

FIG. 24 shows multiple magnetic fields that are "spaced" apart on the writing or tracking instrument. Hbar(1,1)', Hbar(1,2)' and Hbar (1,3)' all are able to detection the tilt angle of the writing instrument at various locations on the pen. The space between the magnetically-active thin films (S(M)) may be determined to be a "fulcrum" (F) or place at which the writer holds the pen and moves it in 6 degrees of freedom, only 4 of which are vital to recording movement. This fulcrum placement is shown by FIG. 25.

Figure 26:
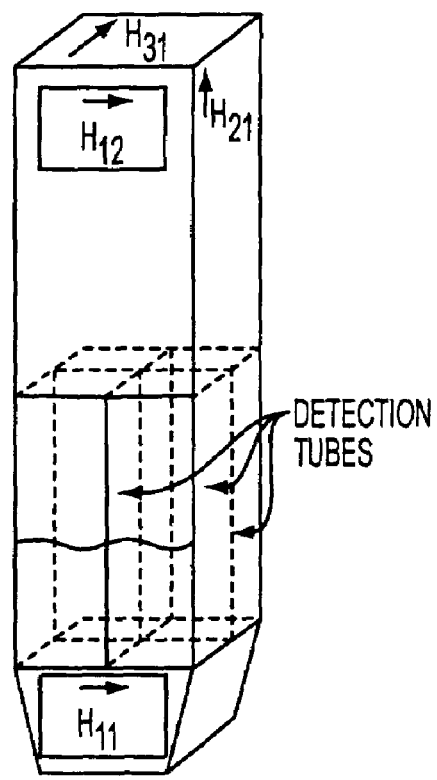
FIG. 26 illustrates detection tube and magnetically active thin films on a single writing or tracking instrument.

FIG. 26 illustrates how the magnetically-active thin films and detection tubes with electrically active viscous material may be placed on a writing instrument together. It is contemplated that for certain writing instruments the axial detection tubes (x and y) will be located closed to the writing tip (T) of the pen, and the rotation measuring devices (both detection tubes and/or magnetically active thin films, for theta) will be located at one or more places at least near the end (D) of the pen and the potential fulcrum (F) as well as a location near the tip (T). However, the need for phi and gamma to have these additional detection structures depends on the complexity of the device. In a preferred embodiment for with writing instrument detection, the phi detector is located near the end (D) of the pen and the gamma detector may also be located near the end (D) of the pen for maximum angle determination.

One of the advantages of the present invention is that two-dimensional motion of a writing instrument may be economically computed from 4 degrees of freedom (x, y, tilt and rotation) in one embodiment and 5 degrees in a preferred embodiment (including "spin" measurements) to orient at least two of the other measurements. FIGS. 27A-D illustrate the recording of 4 distinct sample motions (sampling rate undetermined) of a script "R." Each motion has a beginning point (B(x), where x={1,2,3,4}) and an end point (E(x) where x={1,2,3,4}).

The motions of creating the script "R" in FIGS. 27A-D are illustrative only and each pen user's motions may include different motions. As can be appreciated by those skilled in the art one of the advantages of the present invention is that each writer can have different techniques that result in the same approximate motion recording. For example, certain writers may not move the pen axially much, but primarily in a rotational manner, other writers may pull the pen off of the paper frequently. In the embodiment of the invention where the recording is trained to correspond to certain motions, the computational accuracy of text recognition will improve either in the internal trainable parts of the writing or tracking instrument or the optional computation part of the invention which may be stored on a computation device with more advanced processor, such as a PDA, personal computer, server, or workstation than will be likely be included in the writing or tracking device. However, as processing speeds improve, certain processors may be able to be included in the writing or tracking device. However, ASICs designed for use with the present invention in mind will add to the cost of the writing instruments.

Figure 27A:
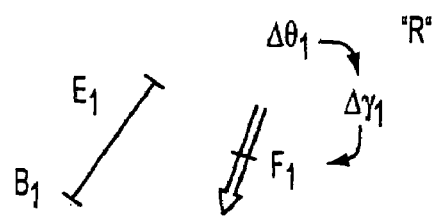
FIGS. 27A-F illustrate a sample motion of a pen over 4 discrete time periods in two dimensions.
Figure 27B:
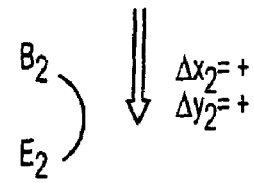
Figure 27C:
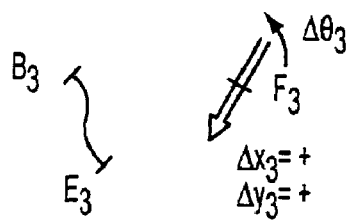
Figure 27D:
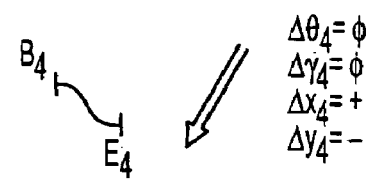

In FIG. 27A, the motion between B(1) and E(1), at time t(0) to t(1−), is created through a rotational movement in the tilt (theta(1)) and rotational (gamma(1)) axes around the fulcrum (F1). FIG. 27B, shows that the stroke between B(2) and E(2) (the assumption is that the pen was not lifted off the paper, but in other illustrations it certainly could have been), from time t(1+) to t(2−), is movement in the x and y transversal axes without significant or detected motion in the rotational directions. FIG. 27C shows that the motion from time t(2+) to t(3−) between B(3) and E(3) has both x and y transversal movement and rotation in the tilt (theta 3) axis. FIG. 27D shows in time t(3+) to t(4−) that B(4) to E(4) has only x and y transversal motion and then the pen in either tiled around the fulcrum (F4) or lifted off the paper with optional Z-axis detection at time t(4).

TABLE 1

Sample illustration of 6-degree detection shown in FIGS. 27A-D

| degree of freedom | time slot | | | | |
|---|---|---|---|---|---|
| | t(0)-t(1−) | t(1+)-t(2−) | t(2+)-t(3−) | t(3+)-t(4−) | t(4+) |
| x (pos) | 0 | ++ | − | + | signal off |
| y (pos) | 0 | − | −− | − | signal off |
| theta | ++ | 0 | + | 0 | signal off |
| gamma | + | 0 | 0 | 0 | 0 |
| phi (orientation) | 87 | 92 | 92 | 95 | 100 |
| Z (pos) | 0 | 0 | 0 | 0 | + |

Figure 27E:
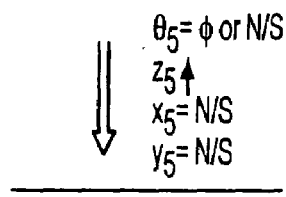
Figure 27F:
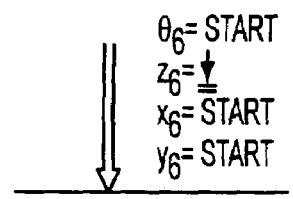

The above table also illustrates an important feature of "single signal override" involved in the present invention. In the above table the activation of the positive z axis signal indicates that the pen has been lifted off the paper and recording is therefore not needed for the other transversal axial directions and no sample signal should be processed that indicates the pen is actively writing. As can be appreciated by those skilled in the art, other overide signals can have similar influence over non-recordaing or activation. For example, a negative z motion with a sudden stop in that direction may activate recording again. These two motions are shown in FIGS. 27E and 27F, respectively.

Figure 30A:
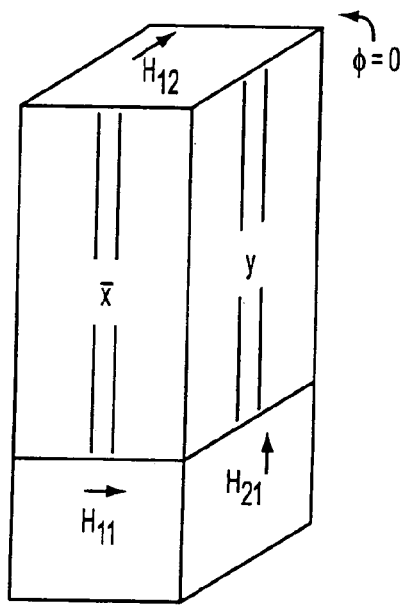
FIGS. 30A-D illustrate measuring the spin of the instrument to orient other axial or rotational measurements.
Figure 30B:
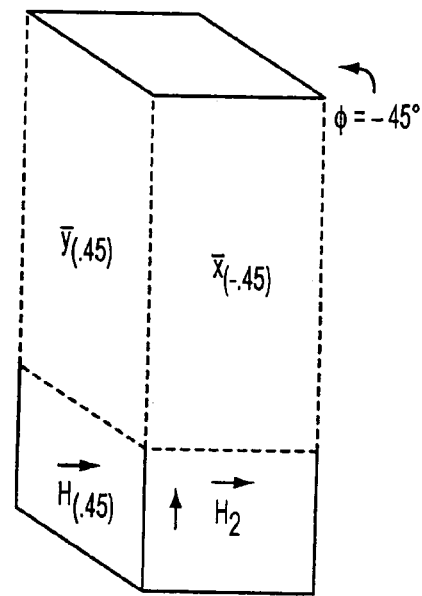
Figure 30C:
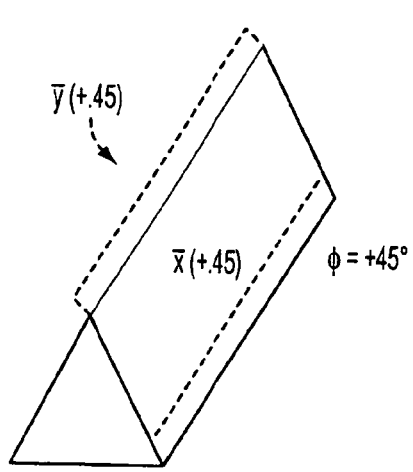
Figure 30D:
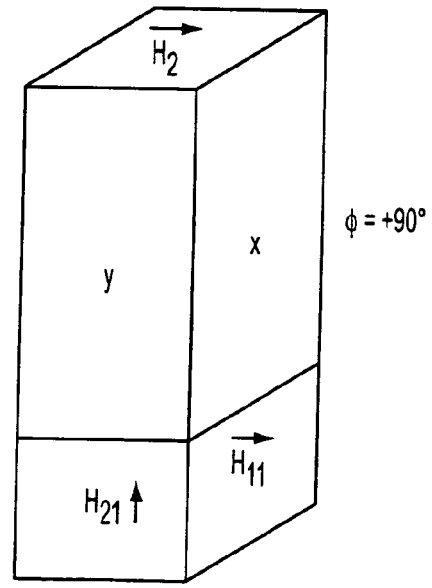

A brief discussion on the value of measuring the "spin" angle in the writing instrument is warranted. Although the "spin" is not likely to figure into the computation of the motion of the writing instrument per se, it may be important to provide an "orientation" point in some of the embodiments of the device. Thus, when the data is downloaded to the computational device, it will not make a difference how the pen is held. This is illustrated by FIGS. 30A-C in which a user is twisting or spining the pen inadvertently, but the motion recording system adapts. Thus, detection tubes that normally would measure a positive x direction can easily measure the negative y direction when the spin angle (or Phi) is taken into account.

The measurement of the Z (or up and down) axis of a pen may be less important in the writing detection embodiment of the present invention than the recording the motion of a tracking instruments. Thus, the configuration of the detection tubes for the Z-direciton may be configured differently than the "2-dimensional" axis measurements. This is shown in FIG. 31, where the Z axis detection tubes are placed in a different plane than the X and Y axis tubes. However, in a cylindrical, conical or spherical coordinate computational system, the Z-axis may have more importance for determining the movement of an instrument in absolute terms and thus behave more like a pure single axis accelerometer. This is illustrated by FIG. 32.

Referring now to FIG. 33, a sample computation table is shown for a two state system (+ and 0) for two detectors in the x, y, z transversal diections and the theta, gamma and phi rotational directions or orientations at 5 time samples. Thus, 12 different detection devices are required to generate this computation table, but there may be any number of such detection devices required to generate the necessary information for accurate recording. For example, only a single detection device may be require for Z axis motion or spin orientation.

Referring now to FIG. 34, a sample computation table for a three-state system or a complementary-two-state system in which positive and negative movement, rotational or orientation thresholds are detected independently in one direction and then processed by the computation device. For example, the X(2) transversal movement detector measures movement thresholds in the negative x axial direction. A negative phi indicates the writing instrument has been turned the other way and the "recompassing" or re-orientation is necessary. Although a "negative" theta is shown, it is not anticipated that this will be used in the writing detection embodiment as the writing will be assumed to be generally writing on a flat surface. However, the negative theta may be important for the tracking recording embodiment of the invention.

FIGS. 35 and 36 show internal or external training for the present invention for the two and three state systems shown in FIGS. 33 and 34 respectively for users 1, 2, and 3. The training may take place through a variety of methods which involved optical character recognition, approximation, and other well-known methods. However, it is contemplated that direct user feedback will be the most effective training technique. A user will write a series of words and/or symbols either in free-form or through pre-determined text/symbols/drawings and then type or speak the text into the computational device. Over a period of a few trainings, the pen will be correlate the specific electrical signals from the motion of the pen to the correct text. Through this technique multiple users for the same writing instrument can each use the invention to their advantage, through a software or hardware switch. (This may be particularly useful in using the writing detection in industrial or commercial settings where there may be multiple users.). This is shown in FIG. 37.

The user may also be able to develop their own shorthand or specialized character set to train the pen to correlate "personal" shorthand symbols to strings of text, drawings, graphs, symbols, signatures, etc. Thus, the user may be able to use the pen at any location to write out a few lines, but when the user places the downloading system in the computer, completed pages of text and graphs are placed into a document or series or documents. This is shown by FIGS. 38A-C.

There are many other relevant features including initialization by motion and the entire motion determination processing module which are optional and need not be taught to practice the invention.

Having described my invention, I claim:

1. A system for digitally recording the motion of an instrument including:

a power source;

at least two partially hollow tubes made of electricically-conductive material coupled to said power source through first connection, said at least two partially hollow tubes including a viscous material in the interior contacting said electrically-conductive material in a first volumetric configuration, wherein when said at least one of said at least partially hollow tubes moves in an axial or rotational direction, said viscous material contacts said electrically-conductive material in a second volumetric configuration;

at least one magnetically-active thin film, said thin film changing its magnetic properties based on an orientation of said instrument and operatively affecting at least one electrical signal coupled to said power source;

wherein said first and second volumetric configurations result in distinguishable electrical properities; and a power sink coupled with said at least two electrically-conductive tubes and said at least one thin-film-modified electrical signal through a second connection.

2. A system for tracking the motion of a writing instrument including:

a clock controlling a power source;

a series of virtual resistors coupled with said power source, each virtual resistor including a detection tube with a electrically active varying material, wherein the resistance of said of each virtual resistor is dependent upon the configuration of said electrically actice varying material, said material varying with motion of said writing instrument;

a magnetically-active thin film, said thin film detecting at least one angle of orientation and generating a signal;

a power sink; and a signal processor.

* * * * *